(12) United States Patent
Hayashita et al.

(10) Patent No.: US 10,927,784 B2
(45) Date of Patent: Feb. 23, 2021

(54) ABNORMALITY DIAGNOSIS SYSTEM OF AMMONIA DETECTION DEVICE

(71) Applicant: TOYOTA JIDOSHA KABUSHIKI KAISHA, Toyota (JP)

(72) Inventors: Go Hayashita, Chigasaki (JP); Kimikazu Yoda, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 15/937,571

(22) Filed: Mar. 27, 2018

(65) Prior Publication Data

US 2018/0283308 A1 Oct. 4, 2018

(30) Foreign Application Priority Data

Apr. 4, 2017 (JP) .............................. JP2017-074734

(51) Int. Cl.
*F01N 11/00* (2006.01)
*F02D 41/22* (2006.01)
(Continued)

(52) U.S. Cl.
CPC ......... *F02D 41/222* (2013.01); *F01N 3/0814* (2013.01); *F01N 3/2066* (2013.01);
(Continued)

(58) Field of Classification Search
CPC ...... F01N 11/00; F01N 11/002; F01N 11/007; F01N 2550/00; F01N 2550/05; F01N 2560/021; F01N 2560/025; F01N 2560/026; F01N 2560/06; F01N 2900/1402; F01N 3/0814; F01N 3/2066; F01N 9/005;
(Continued)

(56) References Cited

U.S. PATENT DOCUMENTS

| 4,571,683 A | 2/1986 | Kobayashi et al. |
| 6,843,240 B1 * | 1/2005 | Hahn ................... F01N 3/0842 |
| | | 123/688 |

(Continued)

FOREIGN PATENT DOCUMENTS

DE 100 62 289 A1 7/2002
WO WO 2013/161032 A1 10/2013

*Primary Examiner* — Hai H Huynh
*Assistant Examiner* — Diem T Tran
(74) *Attorney, Agent, or Firm* — Finnegan, Henderson, Farabow, Garrett & Dunner, LLP

(57) ABSTRACT

The abnormality diagnosis system 1, 1', 1" of an ammonia detection device 46, 71 comprises: an air-fuel ratio detection device 41, 72 arranged in the exhaust passage 22 at the downstream side of the catalyst 20; an air-fuel ratio control part 51 configured to control an air-fuel ratio of exhaust gas; and an abnormality judgment part 52 configured to judge abnormality of the ammonia detection device. The air-fuel ratio control part performs rich control making the air-fuel ratio of the inflowing exhaust gas richer than a stoichiometric air-fuel ratio. The abnormality judgment part judges that the ammonia detection device is abnormal if, after start of the rich control, an output value of the ammonia detection device does not rise to a reference value before the air-fuel ratio detected by the air-fuel ratio detection device falls to a rich judged air-fuel ratio richer than a stoichiometric air-fuel ratio.

16 Claims, 18 Drawing Sheets

(51) Int. Cl.
  *F01N 3/08* (2006.01)
  *F01N 9/00* (2006.01)
  *F02D 41/14* (2006.01)
  *F02D 41/02* (2006.01)
  *F01N 3/20* (2006.01)
  *F02D 41/08* (2006.01)
  *F02D 41/06* (2006.01)
  *F02D 41/16* (2006.01)
  *F02D 41/12* (2006.01)

(52) U.S. Cl.
  CPC .............. *F01N 9/005* (2013.01); *F01N 11/00* (2013.01); *F01N 11/002* (2013.01); *F01N 11/007* (2013.01); *F02D 41/0235* (2013.01); *F02D 41/068* (2013.01); *F02D 41/08* (2013.01); *F02D 41/126* (2013.01); *F02D 41/1445* (2013.01); *F02D 41/1446* (2013.01); *F02D 41/1447* (2013.01); *F02D 41/1454* (2013.01); *F02D 41/1463* (2013.01); *F02D 41/1475* (2013.01); *F02D 41/16* (2013.01); *F01N 2550/00* (2013.01); *F01N 2550/05* (2013.01); *F01N 2560/021* (2013.01); *F01N 2560/025* (2013.01); *F01N 2560/026* (2013.01); *F01N 2560/06* (2013.01); *F01N 2900/1402* (2013.01); *F02D 2041/1468* (2013.01); *F02D 2200/0802* (2013.01); *F02D 2200/0804* (2013.01); *Y02T 10/12* (2013.01); *Y02T 10/40* (2013.01)

(58) Field of Classification Search
  CPC ..... F02D 2041/1468; F02D 2200/0802; F02D 2200/0804; F02D 41/0235; F02D 41/068; F02D 41/08; F02D 41/126; F02D 41/1445; F02D 41/1446; F02D 41/1447; F02D 41/1454; F02D 41/1463; F02D 41/1475; F02D 41/16; F02D 41/222; Y02T 10/24; Y02T 10/47
  See application file for complete search history.

(56) References Cited

U.S. PATENT DOCUMENTS

| | | | |
|---|---|---|---|
| 9,222,420 B2 | 12/2015 | Kerns et al. | |
| 2003/0196428 A1* | 10/2003 | Iida | F01N 3/10 60/285 |
| 2009/0165440 A1* | 7/2009 | Sawada | B01D 53/9409 60/276 |
| 2010/0204904 A1* | 8/2010 | Miyashita | F02D 41/1441 701/103 |
| 2011/0202230 A1* | 8/2011 | Sawada | F02D 41/222 701/29.2 |
| 2012/0085143 A1* | 4/2012 | Sakurai | F02D 41/222 73/1.06 |
| 2015/0093292 A1 | 4/2015 | Hagimoto | |
| 2017/0044953 A1* | 2/2017 | Shinoda | B01D 53/9418 |
| 2017/0045471 A1 | 2/2017 | Maeda et al. | |

* cited by examiner

ABNORMALITY DIAGNOSIS SYSTEM OF AMMONIA DETECTION DEVICE

TECHNICAL FIELD

The present invention relates to an abnormality diagnosis system of an ammonia detection device.

BACKGROUND ART

It has been known in the past to arrange an ammonia detection device in an exhaust passage of an internal combustion engine so as to detect a concentration of ammonia in exhaust gas (for example, PLT 1). The ammonia detection device is for example an ammonia sensor ($NH_3$ sensor).

However, in the same way as other sensors, an ammonia detection device gradually deteriorates along with use. For this reason, to precisely detect the concentration of ammonia in exhaust gas, it is desirable to be able to diagnose an abnormality of an ammonia detection device. Therefore, in the abnormality judgment system described in PLT 1, an $NO_X$ sensor able to detect ammonia and $NO_X$ is used to judge abnormality of an ammonia sensor. Specifically, it is judged that the ammonia sensor is abnormal if a difference of an estimated ammonia concentration, which is a difference of a detected value of the $NO_X$ sensor and an estimated value of the $NO_X$ concentration, and an ammonia concentration detected by the ammonia sensor is a threshold value or more.

CITATION LIST

Patent Literature

PLT 1: WO2013/161032A

SUMMARY OF INVENTION

Technical Problem

However, since the estimated value of the $NO_X$ concentration is calculated based on various types of parameters, the error in the calculated value becomes larger. For this reason, with the above-mentioned method using the estimated value of the $NO_X$ concentration, it is difficult to precisely diagnose abnormality of an ammonia sensor.

Therefore, an object of the present invention is to provide an abnormality diagnosis system of an ammonia detection device able to precisely diagnose abnormality of an ammonia detection device.

Solution to Problem

The summary of the present disclosure is as follows.

(1) An abnormality diagnosis system of an ammonia detection device arranged in an exhaust passage of an internal combustion engine at a downstream side of a catalyst in a direction of flow of exhaust, comprising: an air-fuel ratio detection device arranged in the exhaust passage at the downstream side of the catalyst in the direction of flow of exhaust; an air-fuel ratio control part configured to control an air-fuel ratio of inflowing exhaust gas flowing into the catalyst; and an abnormality judgment part configured to judge abnormality of the ammonia detection device, wherein the air-fuel ratio control part is configured to perform rich control making the air-fuel ratio of the inflowing exhaust gas richer than a stoichiometric air-fuel ratio so that an oxygen storage amount of the catalyst decreases, and the abnormality judgment part is configured to judge that the ammonia detection device is abnormal if, after start of the rich control, an output value of the ammonia detection device does not rise to a reference value before the air-fuel ratio detected by the air-fuel ratio detection device falls to a rich judged air-fuel ratio richer than a stoichiometric air-fuel ratio.

(2) The abnormality diagnosis system of an ammonia detection device described in above (1), wherein the abnormality judgment part is configured to judge that an output of the ammonia detection device is falling if, after the start of the rich control, the output value of the ammonia detection device does not rise to the reference value until a predetermined time elapses from when the air-fuel ratio detected by the air-fuel ratio detection device falls to the rich judged air-fuel ratio.

(3) The abnormality diagnosis system of an ammonia detection device described in above (1) or (2), wherein the abnormality judgment part is configured to judge that a response of the ammonia detection device is falling if, after the start of the rich control, the output value of the ammonia detection device rises to the reference value within a predetermined time from when the air-fuel ratio detected by the air-fuel ratio detection device falls to the rich judged air-fuel ratio.

(4) The abnormality diagnosis system of an ammonia detection device described in any one of above (1) to (3), further comprising a temperature detection part configured to detect or estimate a temperature of the catalyst or a temperature of exhaust gas flowing out from the catalyst, wherein the air-fuel ratio control part is configured to perform the rich control when a temperature detected or estimated by the temperature detection part is less than a predetermined temperature.

(5) The abnormality diagnosis system of an ammonia detection device described in any one of above (1) to (3), wherein the air-fuel ratio control part is configured to perform the rich control when the internal combustion engine is in an idling state.

(6) The abnormality diagnosis system of an ammonia detection device described in any one of above (1) to (5), wherein the abnormality judgment part is configured to judge abnormality of the air-fuel ratio detection device, judge abnormality of the ammonia detection device if judging that the air-fuel ratio detection device is normal, and not judge abnormality of the ammonia detection device if judging that the air-fuel ratio detection device is abnormal.

(7) The abnormality diagnosis system of an ammonia detection device described in any one of above (1) to (5), wherein the abnormality judgment part is configured to judge abnormality of the air-fuel ratio detection device, and the air-fuel ratio control part is configured to correct at least one of output characteristics of the air-fuel ratio detection device and the rich judged air-fuel ratio if it is judged by the abnormality judgment part that the air-fuel ratio detection device is abnormal.

(8) The abnormality diagnosis system of an ammonia detection device described in any one of above (1) to (7), wherein the air-fuel ratio control part is configured to perform lean control making the air-fuel ratio of the inflowing exhaust gas leaner than a stoichiometric air-fuel ratio so that the oxygen storage amount of the catalyst increases, before the rich control.

(9) The abnormality diagnosis system of an ammonia detection device described in above (8), further comprising a steering wheel touch sensor detecting the driver touching the steering wheel, wherein the air-fuel ratio control part is configured to start the rich control when the air-fuel ratio detected by the air-fuel ratio detection device rises to a lean judged air-fuel ratio leaner than a stoichiometric air-fuel ratio.

(10) The abnormality diagnosis system of an ammonia detection device described in any one of above (1) to (7), wherein the air-fuel ratio control part is configured to start the rich control when fuel cut control where supply of fuel to a combustion chamber of the internal combustion engine is stopped has ended.

(11) The abnormality diagnosis system of an ammonia detection device described in any one of above (1) to (10), wherein the ammonia detection device is a sensor cell of an $NO_X$ sensor.

(12) The abnormality diagnosis system of an ammonia detection device described in above (11), wherein the air-fuel ratio control part is configured to perform lean control making the air-fuel ratio of the inflowing exhaust gas leaner than a stoichiometric air-fuel ratio so that the oxygen storage amount of the catalyst increases, and the air-fuel ratio control part is configured to start the rich control when the air-fuel ratio detected by the air-fuel ratio control part rises to a lean judged air-fuel ratio leaner than the stoichiometric air-fuel ratio due to the lean control, and the abnormality judgment part is configured to judge that the ammonia detection device is abnormal if, after the start of the rich control, the output value of the ammonia detection device does not rise to the reference value in a predetermined period before the air-fuel ratio detected by the air-fuel ratio detection device falls to the rich judged air-fuel ratio.

(13) The abnormality diagnosis system described in above (11) or (12), wherein the air-fuel ratio detection device is a pump cell of the $NO_X$ sensor.

Advantageous Effects of Invention

According to the present invention, there is provided an abnormality diagnosis system of an ammonia detection device able to precisely diagnose abnormality of an ammonia detection device.

DESCRIPTION OF EMBODIMENTS

Figure 1:
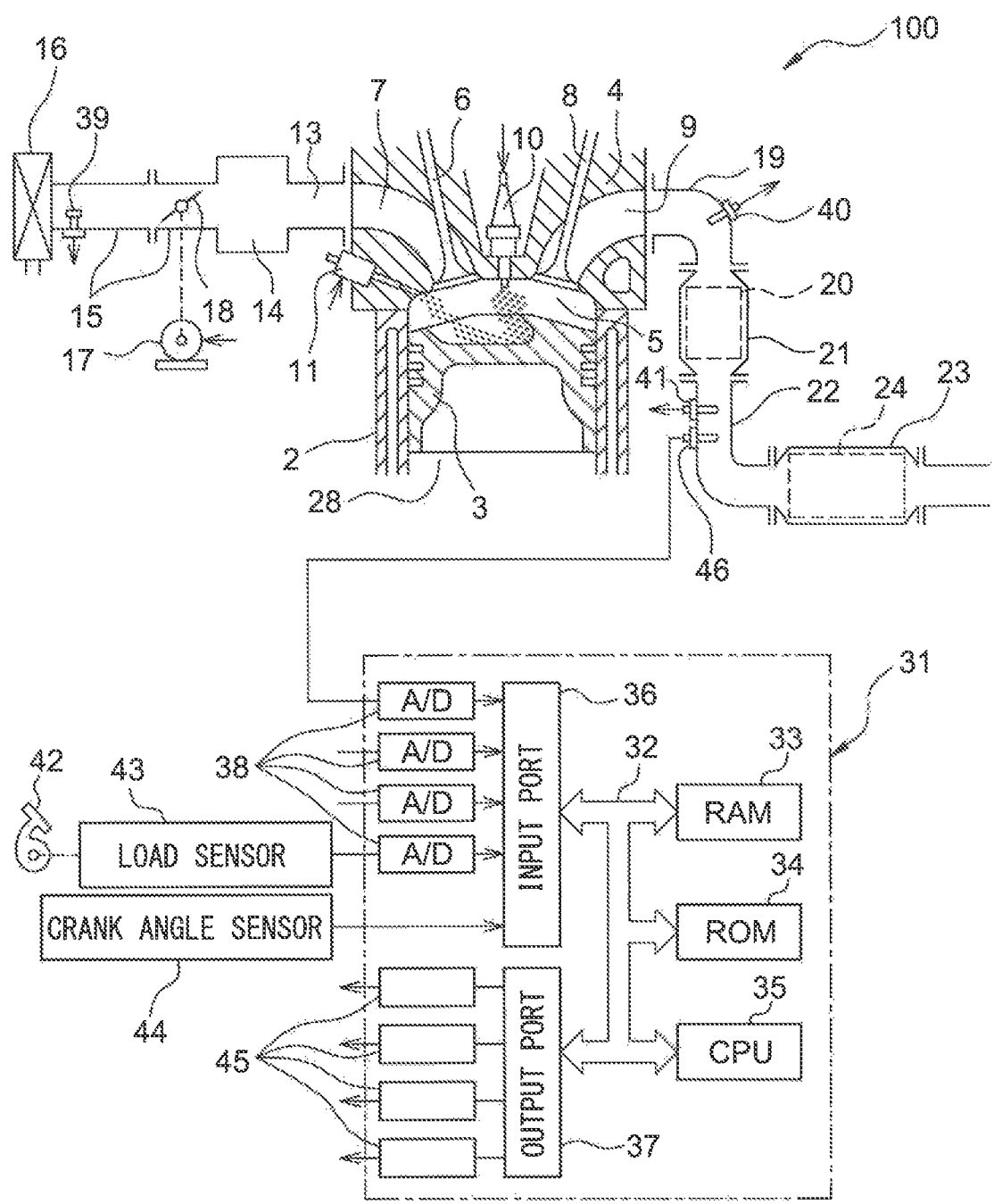
FIG. 1 is a view schematically showing an internal combustion engine provided with an abnormality diagnosis system of an ammonia detection device according to a first embodiment of the present invention.

Below, referring to the figures, embodiments of the present invention will be explained in detail. Note that, in the following explanation, similar components are assigned the same reference numerals.

First Embodiment

First, referring to FIG. 1 to FIG. 10, a first embodiment of the present invention will be explained.

Explanation of Internal Combustion Engine Overall

FIG. 1 is a view schematically showing an internal combustion engine 100 provided with an abnormality diagnosis system of an ammonia detection device according to a first embodiment of the present invention. The internal combustion engine 100 shown in FIG. 1 is a spark ignition type internal combustion engine (gasoline engine). The internal combustion engine 100 is mounted in a vehicle.

Referring to FIG. 1, 2 indicates a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9. The cylinder block 2 defines cylinders 28.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

Various control routines of the internal combustion engine are performed by an electronic control unit (ECU) 31. The ECU 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 detecting the flow rate of air which flows through the intake pipe 15 is arranged. The output of the air flow meter 39 is input through a corresponding AD converter 38 to the input port 36.

Further, at the header of the exhaust manifold 19, i.e., a upstream side of the upstream side catalyst 20 in the direction of flow of exhaust, an upstream side air-fuel ratio sensor 40 is arranged which detects the air-fuel ratio of the exhaust gas which flows through the inside of the exhaust manifold 19 (that is, the exhaust gas which flows into the upstream side catalyst 20). In addition, in the exhaust pipe 22, i.e., a downstream side of the upstream side catalyst 20 in the direction of flow of exhaust, a downstream side air-fuel ratio sensor 41 is arranged which detects the air-fuel ratio of the exhaust gas flowing through the inside of the exhaust pipe 22 (that is, the exhaust gas which flows out from the upstream side catalyst 20). The outputs of the air-fuel ratio sensors 40 and 41 are input through the corresponding AD converters 38 to the input port 36.

Further, inside the exhaust pipe 22, that is, at the downstream side of the upstream side catalyst 20 in the direction of flow of exhaust, an ammonia sensor ($NH_3$ sensor) 46 for detecting the ammonia concentration ($NH_3$ concentration) in the exhaust gas flowing through the inside of the exhaust pipe 22 (that is, exhaust gas flowing out from the upstream side catalyst 20) is arranged. The ammonia sensor 46 is arranged in the exhaust passage adjacent to the downstream side air-fuel ratio sensor 41. In the present embodiment, the ammonia sensor 46 is arranged at the downstream side of the downstream side air-fuel ratio sensor 41 in the direction of flow of exhaust. Further, the downstream side air-fuel ratio sensor 41 and ammonia sensor 46 are arranged between the upstream side catalyst 20 and downstream side catalyst 24 in the direction of flow of exhaust. Note that, as long as the ammonia sensor 46 is at the downstream side of the upstream side catalyst 20 in the direction of flow of exhaust, it may be arranged at the upstream side from the downstream side air-fuel ratio sensor 41 in the direction of flow of exhaust. The output of the ammonia sensor 46 is input through a corresponding AD converter 38 to the input port 36.

Further, an accelerator pedal 42 is connected to a load sensor 43 generating an output voltage proportional to the amount of depression of the accelerator pedal 42. The output voltage of the load sensor 43 is input through a corresponding AD converter 38 to the input port 36. A crank angle sensor 44 generates an output pulse every time the crankshaft rotates, for example, by 15 degrees. This output pulse is input to the input port 36. In the CPU 35, the engine speed is calculated from the output pulse of the crank angle sensor 44. On the other hand, the output port 37 is connected through corresponding drive circuits 45 to the spark plugs 10, fuel injectors 11, and the throttle valve drive actuator 17.

Note that, the above-mentioned internal combustion engine 100 is a nonsupercharged internal combustion engine fueled by gasoline, but the configuration of the internal combustion engine 100 is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine 100 may differ from the configuration shown in FIG. 1. For example, the fuel injectors 11 may be arranged to inject fuel into the intake ports 7. Further, the internal combustion engine 100 may be a compression ignition type internal combustion engine (diesel engine).

Explanation of Catalyst

The upstream side catalyst 20 and downstream side catalyst 24 arranged in the exhaust passage have similar configurations. The catalysts 20 and 24 have oxygen storage abilities. The catalysts 20 and 24 are for example three-way catalysts. Specifically, the catalysts 20 and 24 are comprised of carriers comprised of ceramic on which a precious metal having a catalytic action (for example, platinum (Pt)) and a substance having an oxygen storage ability (for example, ceria ($CeO_2$)) are carried. The catalysts 20 and 24 can simultaneously remove unburned gas (HC, CO, etc.) and nitrogen oxides ($NO_X$) if reaching a predetermined activation temperature.

The catalysts 20 and 24 store the oxygen in the exhaust gas when the air-fuel ratio of the exhaust gas flowing into the catalysts 20 and 24 is an air-fuel ratio leaner than the stoichiometric air-fuel ratio (below, referred to as a "lean air-fuel ratio"). On the other hand, the catalysts 20 and 24 release the oxygen stored in the catalysts 20 and 24 when the air-fuel ratio of the inflowing exhaust gas is an air-fuel ratio richer than the stoichiometric air-fuel ratio (below, referred to as a "rich air-fuel ratio").

Figure 2A:
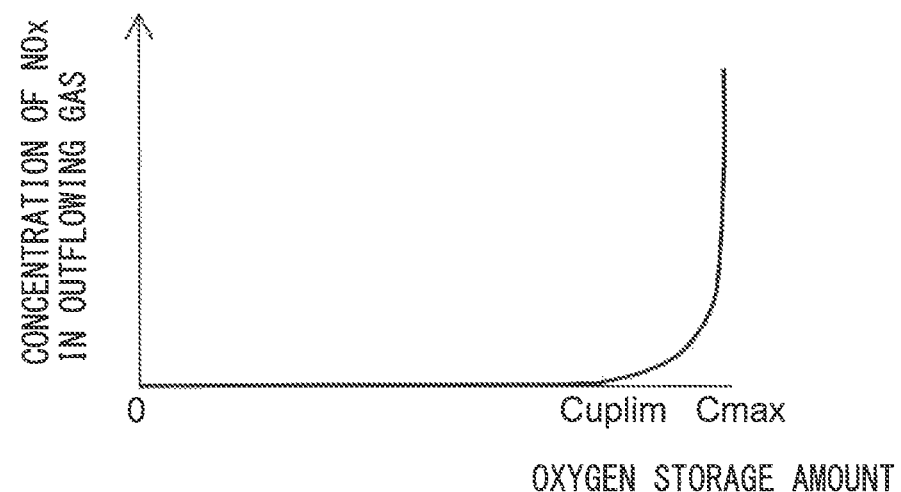
FIG. 2A is a view showing a relationship between an oxygen storage amount of a catalyst and a concentration of $NO_X$ in the exhaust gas flowing out from the catalyst.

The catalysts 20 and 24 have catalytic actions and oxygen storage abilities, so have the actions of removing the $NO_X$ and unburned gas according to the oxygen storage amounts. If the air-fuel ratio of the exhaust gas flowing into the catalysts 20 and 24 is a lean air-fuel ratio, as shown in FIG. 2A, when the oxygen storage amounts are small, the oxygen in the exhaust gas is stored in the catalysts 20 and 24 and the $NO_X$ in the exhaust gas is removed by reduction. Further, if the oxygen storage amounts become large, the concentrations of oxygen and $NO_X$ in the exhaust gas flowing out from the catalysts 20 and 24 rapidly rise at a certain storage amount near the maximum storable oxygen amounts Cmax (Cuplim in the figure).

Figure 2B:
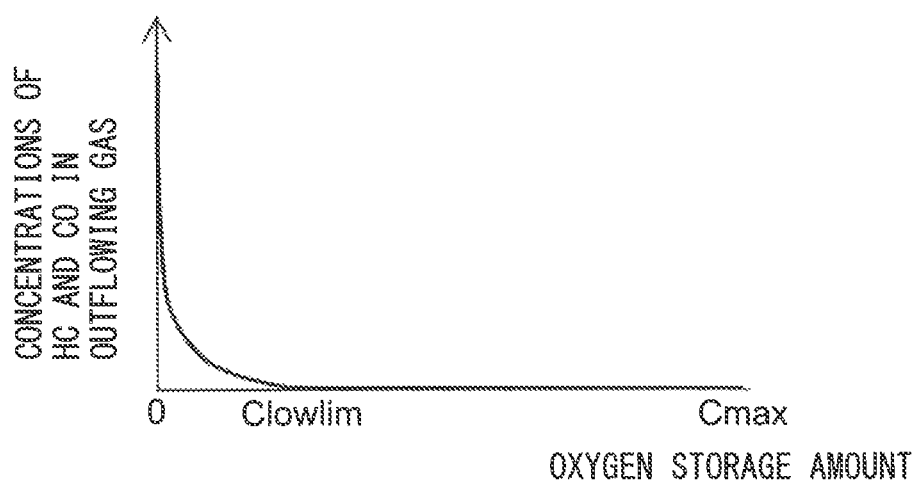
FIG. 2B is a view showing a relationship between an oxygen storage amount of a catalyst and a concentration of HC and CO in the exhaust gas flowing out from the catalyst.

On the other hand, if the air-fuel ratio of the exhaust gas flowing into the catalysts 20 and 24 is a rich air-fuel ratio, as shown in FIG. 2B, when the oxygen storage amounts are large, the oxygen stored in the catalysts 20 and 24 is released and the unburned gas in the exhaust gas is removed by oxidation. Further, if the oxygen storage amounts become small, the concentration of unburned gas in the exhaust gas flowing out from the catalysts 20 and 24 rapidly rises at a certain storage amount near zero (Clowlim in figure). Therefore, the characteristics of removal of the $NO_X$ and unburned gas in the exhaust gas change in accordance with the air-fuel ratio of the exhaust gas flowing into the catalysts 20 and 24 and oxygen storage amounts of the catalysts 20 and 24.

Note that, as long as the catalysts 20 and 24 have catalytic actions and oxygen storage abilities, they may be catalysts different from three-way catalysts. Further, the downstream side catalyst 24 may be omitted.

Figure 3:
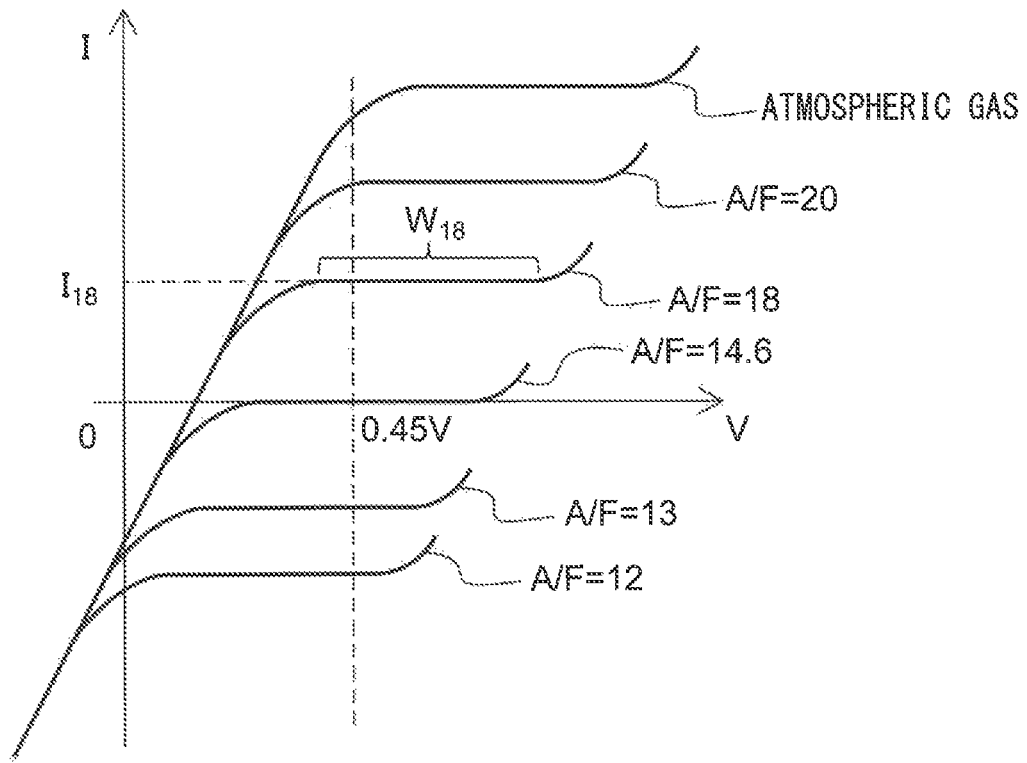
FIG. 3 is a view showing a relationship between a sensor applied voltage and output current at different exhaust air-fuel ratios.
Figure 4:
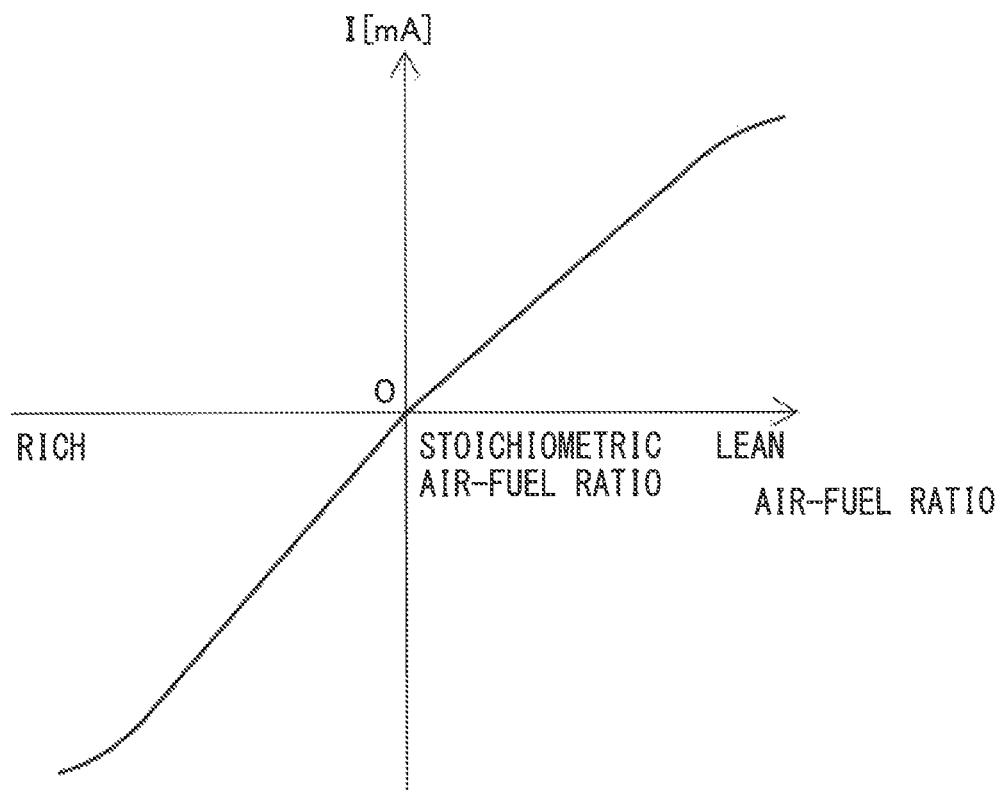
FIG. 4 is a view showing a relationship between an exhaust air-fuel ratio and output current when making the sensor applied voltage constant.

Output Characteristics of Air-Fuel Ratio Sensor Next, referring to FIG. 3 and FIG. 4, the output characteristics of the air-fuel ratio sensors 40 and 41 will be explained. FIG. 3 is a view showing the voltage-current (V-I) characteristics of the air-fuel ratio sensors 40 and 41. FIG. 4 is a graph showing the relationship between the air-fuel ratio of exhaust gas supplied to the air-fuel ratio sensors 40 and 41 (below, referred to as the "exhaust air-fuel ratio") and the output currents I of the air-fuel ratio sensors 40 and 41 when making the applied voltage constant. Note that, in the present embodiment, the air-fuel ratio sensors 40 and 41 have the same configurations.

As will be understood from FIG. 3, the output currents I of the air-fuel ratio sensors 40 and 41 become larger the higher the exhaust air-fuel ratio (the leaner it is). Further, at the V-I lines at the different exhaust air-fuel ratios, there are regions substantially parallel to the V-axis, that is, regions where the output currents do not change much at all even if the applied voltages change. These voltage regions are called "limit current regions". The currents at this time are called the "limit currents". In FIG. 3, the limit current region and limit current when the exhaust air-fuel ratio is 18 are respectively shown by $W_{18}$ and $I_{18}$. Therefore, the air-fuel ratio sensors 40 and 41 are limit current type air-fuel ratio sensors.

FIG. 4 is a view showing the relationship between the exhaust air-fuel ratio and the output current I when making the applied voltage constant at 0.45V or so. As will be understood from FIG. 4, at the air-fuel ratio sensors 40 and 41, the higher the exhaust air-fuel ratios (that is, the leaner they are), the larger the output currents I of the air-fuel ratio sensors 40 and 41. That is, the output currents I change linearly (proportionally) with respect to the exhaust air-fuel ratio. In addition, the air-fuel ratio sensors 40 and 41 are configured so that the output currents I become zero when the exhaust air-fuel ratio is the stoichiometric air-fuel ratio.

Abnormality Diagnosis of Ammonia Sensor

In the present embodiment, the upstream side air-fuel ratio sensor 40 can be used to detect the air-fuel ratio of the exhaust gas flowing into the upstream side catalyst 20 (below, referred to as the "inflowing exhaust gas"), while the downstream side air-fuel ratio sensor 41 can be used to detect the air-fuel ratio of the exhaust gas flowing out from the upstream side catalyst 20 (below, referred to as the "outflowing exhaust gas"). Further, the ammonia sensor 46 can be used to detect the concentration of ammonia in the outflowing exhaust gas. However, the air-fuel ratio sensors 40 and 41 and ammonia sensor 46 gradually deteriorate along with use. For this reason, in order to precisely detect the exhaust air-fuel ratio and concentration of ammonia in the exhaust gas, it is desirable to be able to detect abnormality of these sensors.

In order to precisely diagnose abnormality of the sensors, it is desirable that the components of the gas supplied to the sensors are known. For example, when fuel cut control is performed where the supply of fuel to the combustion chambers 5 of the internal combustion engine 100 is stopped, air is discharged into the exhaust passage. The concentration of oxygen in the air is about 23%. For this reason, by detecting the outputs of the air-fuel ratio sensors 40 and 41 during fuel cut control, it is possible to precisely diagnose abnormality of the air-fuel ratio sensors 40 and 41.

However, air does not contain ammonia, so during a fuel cut, abnormality of the ammonia sensor 46 cannot be diagnosed. Further, the concentration of ammonia in exhaust gas supplied to the ammonia sensor 46 greatly fluctuates depending on the operating state of the internal combustion engine 100 and the deteriorated state of the upstream side catalyst 20. For this reason, in order to precisely detect abnormality of the ammonia sensor 46, it is necessary to use a method different from the air-fuel ratio sensors 40 and 41. The inventors of the present application took note of the mechanism by which exhaust gas is purified at the upstream side catalyst 20 when exhaust gas of a rich air-fuel ratio flows into the upstream side catalyst 20, and discovered a new method of diagnosing abnormality of the ammonia sensor 46.

Figure 5:
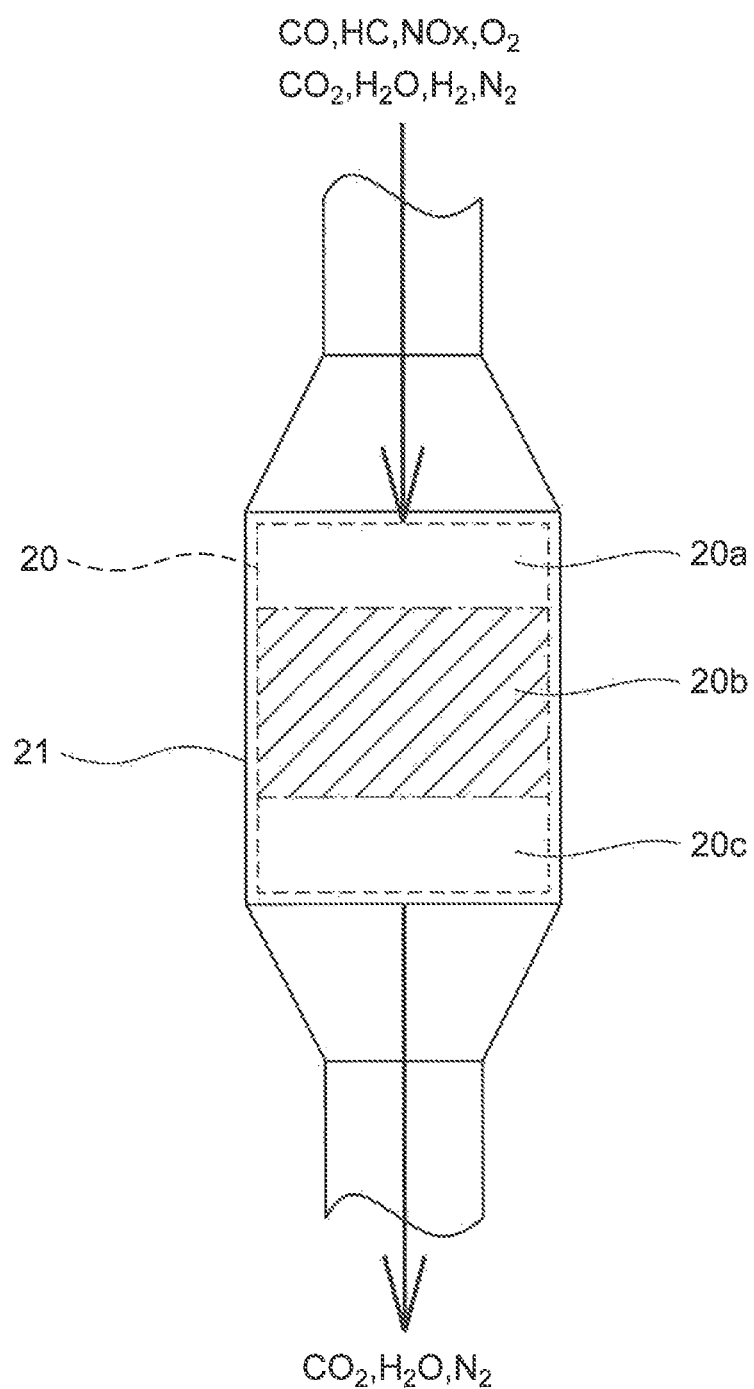
FIG. 5 is a view schematically showing an upstream side catalyst in a state where an oxygen storage amount is small.

Below, the mechanism by which exhaust gas is purified at the upstream side catalyst 20 when exhaust gas of a rich air-fuel ratio flows into the upstream side catalyst 20 will be explained. FIG. 5 is a view schematically showing an upstream side catalyst 20 in the state where the oxygen storage amount is small. FIG. 5 shows the direction of flow of exhaust by arrows. In this example, exhaust gas of a rich air-fuel ratio continues to flow into the upstream side catalyst 20. If exhaust gas of a rich air-fuel ratio flows into the upstream side catalyst 20, in order to remove the unburned gas, the oxygen stored in the upstream side catalyst 20 is released. The oxygen stored in the upstream side catalyst 20 is successively released from the upstream side of the upstream side catalyst 20 in the direction of flow of exhaust. For this reason, in the example of FIG. 5, an oxygen storage region 20c where oxygen is stored remains only at the downstream side of the upstream side catalyst 20.

Exhaust gas of a rich air-fuel ratio mainly contains carbon monoxide (CO), hydrocarbon (HC), nitrogen oxides ($NO_X$), oxygen ($O_2$), carbon dioxide ($CO_2$), water ($H_2O$), hydrogen ($H_2$), and nitrogen ($N_2$). The larger the rich degree of the air-fuel ratio, the higher the concentrations of hydrocarbons and carbon monoxide in the exhaust gas and the lower the concentration of $NO_X$ in the exhaust gas. If exhaust gas flows into the upstream side catalyst 20 in the state shown in FIG. 5, first, the unburned oxygen not burned in the combustion chambers 5 is consumed by the following oxygen consumption reaction (1) at the upstream side region 20a of the upstream side catalyst 20:

$$O_2+HC+CO+H_2 \rightarrow H_2O+CO_2 \quad (1)$$

The region between the upstream side region 20a and the oxygen storage region 20c is the rich region 20b where almost all of the stored oxygen is released. The rich region 20b is shown by hatching in FIG. 5. In the rich region 20b, the following water gas shift reaction (2) and steam reforming reaction (3) occur.

$$CO+H_2O \rightarrow H_2+CO_2 \quad (2)$$

$$HC+H_2O \rightarrow CO+H_2 \quad (3)$$

Further, in the rich region 20b, ammonia ($NH_3$) is produced by the following NO removal reaction (4):

$$NO+CO+H_2 \rightarrow N_2+H_2O+CO_2+NH_3 \quad (4)$$

Further, oxygen slightly remains in the rich region 20b as well. Further, hydrogen has a higher reactivity with oxygen than ammonia. For this reason, in the rich region 20b, the following hydrogen oxidation reaction (5) occurs whereby part of the hydrogen generated by the above water gas shift reaction (2) and steam reforming reaction (3) is oxidized.

$$H_2+O \rightarrow H_2O \quad (5)$$

On the other hand, the oxygen storage region 20c stores a sufficient amount of oxygen. For this reason, the hydrogen which was not oxidized in the rich region 20b changes to water by the above hydrogen oxidation reaction (5) in the oxygen storage region 20c. Further, the ammonia produced by the above NO removal reaction (4) in the rich region 20b is purified to water and nitrogen by the following ammonia oxidation reaction (6) in the oxygen storage region 20c:

$$NH_3+O \rightarrow H_2O+N_2 \quad (6)$$

Due to the above chemical reactions, the harmful substances in the exhaust gas are removed at the upstream side catalyst 20. For this reason, in the state where the upstream side catalyst 20 is storing oxygen, the outflowing exhaust gas mainly contains carbon dioxide, water, and nitrogen.

Figure 6:
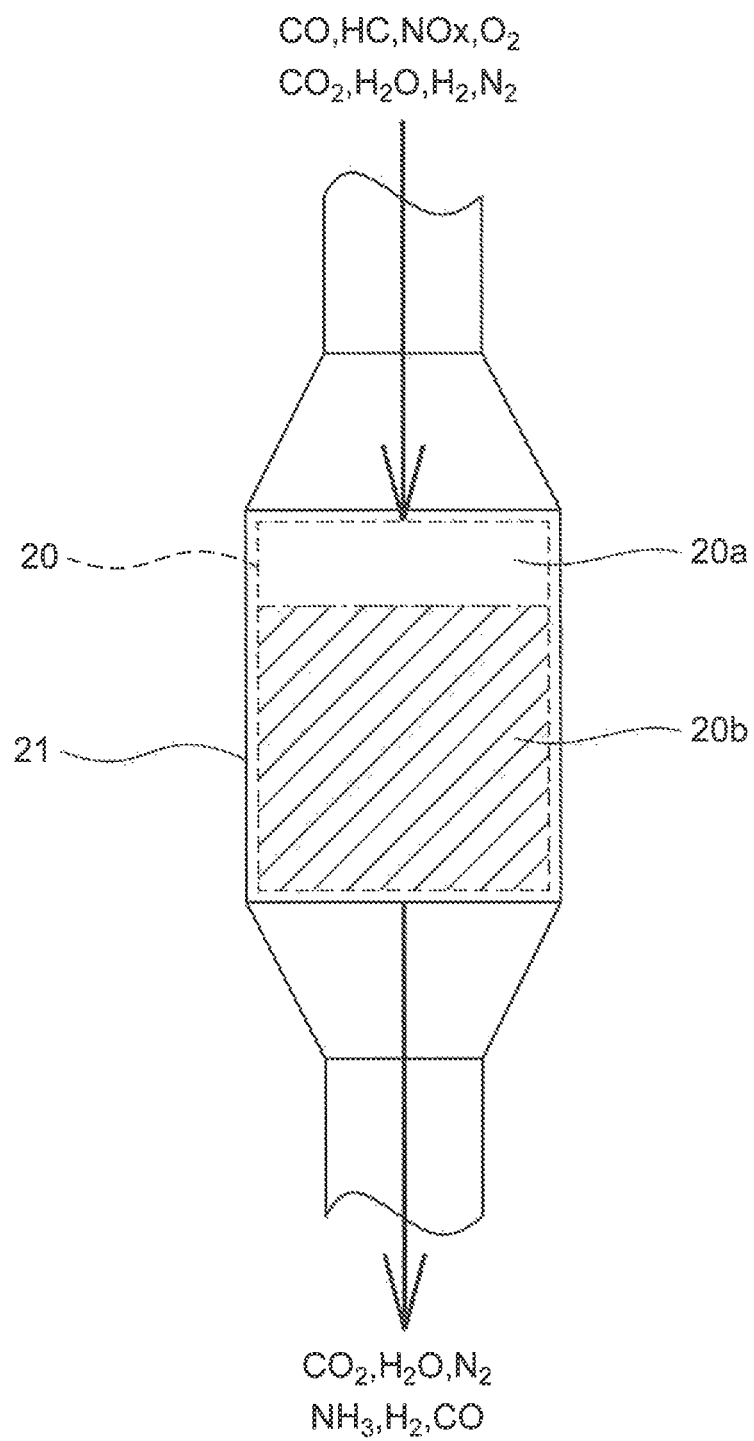
FIG. 6 is a view schematically showing an upstream side catalyst in a state where an oxygen storage amount is substantially zero.

On the other hand, FIG. 6 is a view schematically showing the upstream side catalyst 20 in a state where the oxygen storage amount is substantially zero. In the state of FIG. 5, if exhaust gas of a rich air-fuel ratio further flows into the upstream side catalyst 20, the oxygen of the oxygen storage region 20c is released and, as shown in FIG. 6, the oxygen storage region 20c changes to the rich region 20b. The rich region 20b is shown by hatching in FIG. 6.

In the example of FIG. 6 as well, exhaust gas of a rich air-fuel ratio flows into the upstream side catalyst 20. If exhaust gas of a rich air-fuel ratio flows into the upstream side catalyst 20, in the same way as the example of FIG. 5, first, at the upstream side region 20a, the unburned oxygen which was not burned in the combustion chambers 5 is consumed by the above oxygen consumption reaction (1). Next, at the rich region 20b, the above-mentioned water gas shift reaction (2), steam reforming reaction (3), NO removal reaction (4), and hydrogen oxidation reaction (5) occur.

The upstream side catalyst 20 shown in FIG. 6 does not have an oxygen storage region 20c. For this reason, the ammonia produced by the above NO removal reaction (4) in the rich region 20b flows out from the upstream side catalyst 20 without being oxidized. On the other hand, a part of the hydrogen produced by the above water gas shift reaction (2) and steam reforming reaction (3) in the rich region 20b is oxidized by the above hydrogen oxidation reaction (5) until the oxygen in the rich region 20b is depleted. For this reason, the speed of rise of the hydrogen concentration in the outflowing exhaust gas becomes slower than the speed of rise of the concentration of ammonia in the outflowing exhaust gas.

Figure 7:
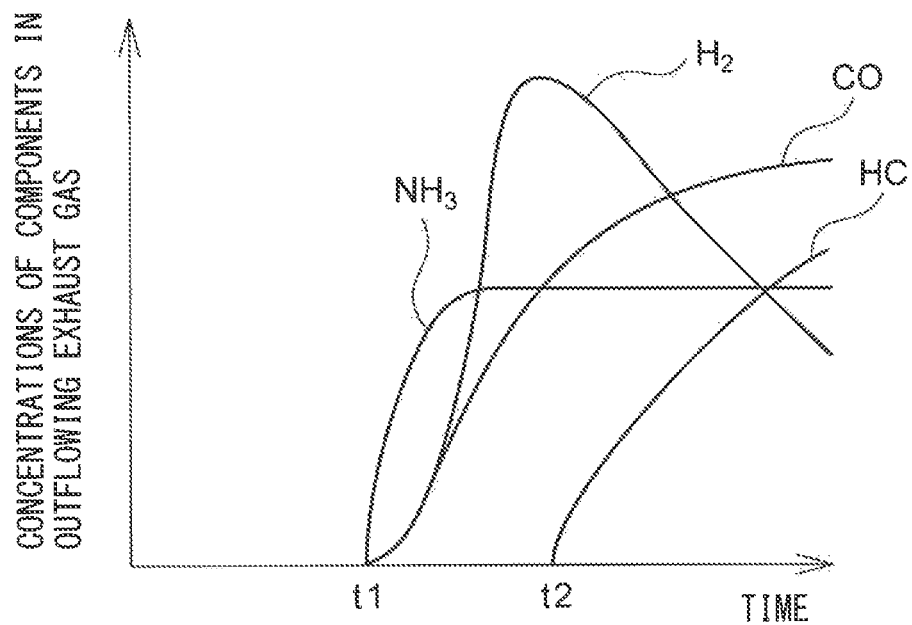
FIG. 7 is a time chart of the concentrations of different components in outflowing exhaust gas when exhaust gas of a rich air-fuel ratio continues to flow into an upstream side catalyst storing oxygen.

FIG. 7 is a time chart of the concentrations of the different components in outflowing exhaust gas when exhaust gas of a rich air-fuel ratio continues to flow into the upstream side catalyst 20 in which oxygen is stored. In this example, at the time t1, due to the exhaust gas of a rich air-fuel ratio, there is no longer an oxygen storage region 20c of the upstream side catalyst 20, and the upstream side catalyst 20 becomes the state of FIG. 6. In the state of FIG. 6, ammonia is not oxidized, so after the time t1, the concentration of ammonia in the exhaust gas rapidly rises. On the other hand, as explained above, hydrogen has a higher reactivity with oxygen than ammonia. For this reason, hydrogen is oxidized until the oxygen in the rich region 20b of the upstream side catalyst 20 is depleted. As a result, after the time t1, the concentration of hydrogen in the exhaust gas rises more slowly than the ammonia concentration.

Further, after the time t1, rich poisoning of the upstream side catalyst 20 occurs and the precious metal of the upstream side catalyst 20 is covered by the rich components (HC, CO, etc.) in the exhaust gas, so the reactivity of the water gas shift reaction falls. As a result, after the time t1, carbon monoxide flows out from the upstream side catalyst 20 and the concentration of carbon monoxide in the exhaust gas gradually rises. At this time, the concentration of carbon monoxide in the exhaust gas rises more slowly than the ammonia concentration. After that, if rich poisoning of the upstream side catalyst 20 progresses and the reactivity of the water gas shift reaction further falls, the concentration of hydrogen in the exhaust gas gradually falls.

Further, if rich poisoning of the upstream side catalyst 20 progresses, the reactivity of the steam reforming reaction also falls. For this reason, after the time t2 after the time t1, hydrocarbons flow out from the upstream side catalyst 20 and the concentration of hydrocarbons in the exhaust gas gradually rises.

The ammonia sensor 46 decomposes ammonia in the outflowing exhaust gas to detect the concentration of ammonia in the outflowing exhaust gas. For this reason, the higher the concentration of ammonia in the outflowing exhaust gas, the greater the output value of the ammonia sensor 46. Further, if the outflow amount of hydrogen, carbon monoxide, and hydrocarbons in addition to ammonia becomes greater, the concentration of oxygen in the outflowing exhaust gas further falls and the air-fuel ratio detected by the downstream side air-fuel ratio sensor 41 changes to the rich side (becomes lower). As explained above, if the oxygen storage amount of the upstream side catalyst 20 approaches zero, the concentration of ammonia in the outflowing exhaust gas rises faster than the concentrations of hydrogen, carbon monoxide, and hydrocarbons. For this reason, change of the output of the ammonia sensor 46 is detected before change of the air-fuel ratio detected by the downstream side air-fuel ratio sensor 41.

Abnormality Diagnosis System of Ammonia Detection Device

Below, an abnormality diagnosis system of an ammonia detection device according to the first embodiment of the present invention (below, simply referred to as an "abnormality diagnosis system") will be explained. The abnormality diagnosis system diagnoses abnormality of the ammonia detection device arranged in the exhaust passage of the internal combustion engine 100 at the downstream side of the upstream side catalyst 20 in the direction of flow of exhaust. The abnormality diagnosis system utilizes the above-mentioned phenomenon to diagnose abnormality of the ammonia detection device.

Figure 8:
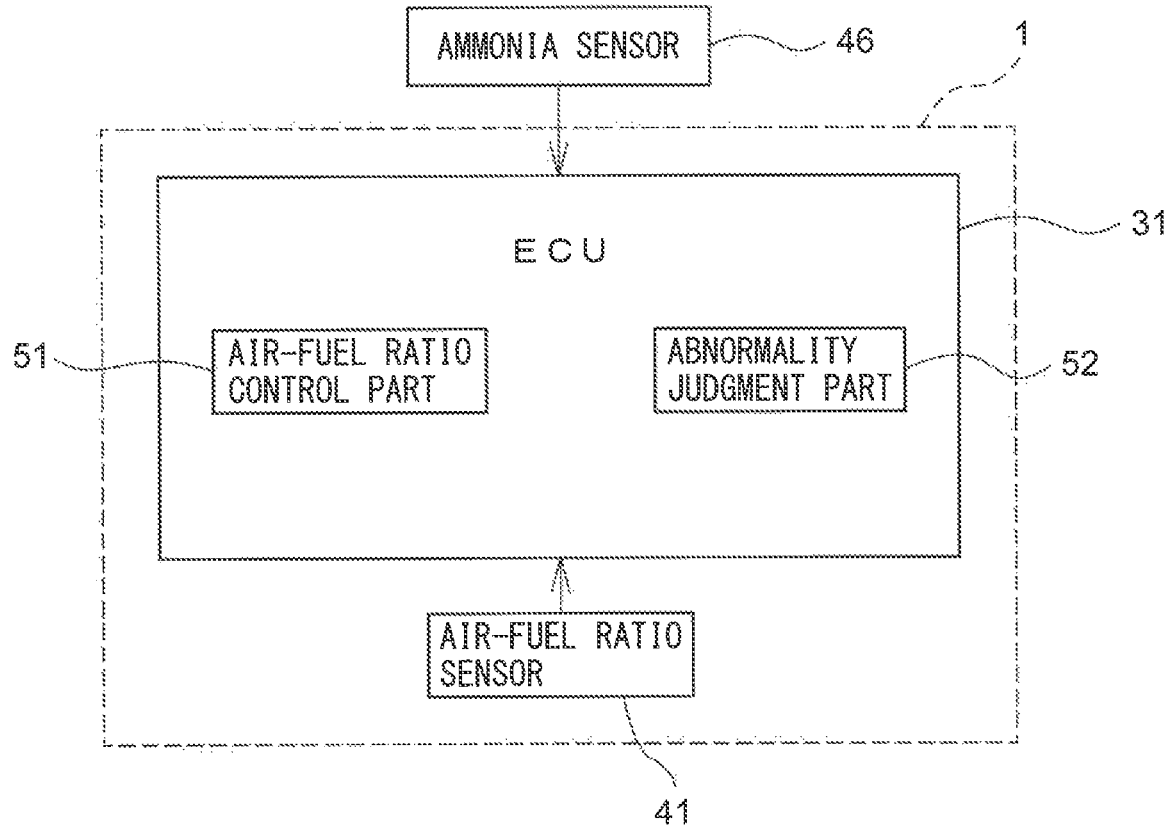
FIG. 8 is a block diagram schematically showing a configuration of an abnormality diagnosis system according to a first embodiment of the present invention.

FIG. 8 is a block diagram schematically showing the configuration of the abnormality diagnosis system 1 according to the first embodiment of the present invention. The abnormality diagnosis system 1 is provided with an air-fuel ratio detection device arranged in the exhaust passage at the downstream side of the upstream side catalyst 20 in the direction of flow of exhaust, an air-fuel ratio control part 51 controlling the air-fuel ratio of the inflowing exhaust gas, and an abnormality judgment part 52 judging abnormality of the ammonia detection device.

The ammonia detection device detects the concentration of ammonia in the outflowing exhaust gas, while the air-fuel ratio detection device detects the air-fuel ratio of the outflowing exhaust gas. In the present embodiment, the ammonia sensor 46 functions as the ammonia detection device, while the downstream side air-fuel ratio sensor 41 functions as the air-fuel ratio detection device. Further, the ECU 31 functions as an air-fuel ratio control part 51 and abnormality judgment part 52. Note that, in the present embodiment, a single ECU 31 is provided, but a plurality of ECUs may be provided for the different functions.

The abnormality diagnosis system 1 diagnoses abnormality of the ammonia sensor 46 based on the outputs of the downstream side air-fuel ratio sensor 41 and ammonia sensor 46 when making the oxygen storage amount of the upstream side catalyst 20 approach zero. For this reason, when using the abnormality diagnosis system 1 to diagnose abnormality of the ammonia sensor 46, the air-fuel ratio control part 51 performs rich control making the air-fuel ratio of the inflowing exhaust gas richer than the stoichiometric air-fuel ratio so that the oxygen storage amount of the upstream side catalyst 20 decreases. In the rich control, the air-fuel ratio of the inflowing exhaust gas is controlled to a rich set air-fuel ratio richer than the stoichiometric air-fuel ratio (in the present embodiment, 14.6). The rich set air-fuel ratio is determined in advance and is, for example, set within the range of 14.4 to 14.5.

Further, the air-fuel ratio control part 51 performs lean control making the air-fuel ratio of the inflowing exhaust gas leaner than the stoichiometric air-fuel ratio so that the oxygen storage amount of the upstream side catalyst 20 increases before performing rich control. Due to this, it is possible to make the oxygen storage amount of the upstream side catalyst 20 when starting rich control greater than zero. In lean control, the air-fuel ratio of the inflowing exhaust gas is controlled to a lean set air-fuel ratio leaner than the stoichiometric air-fuel ratio. The lean set air-fuel ratio is determined in advance and, for example, is set within the range of 14.7 to 15.5. In the present embodiment, the difference between the rich set air-fuel ratio and the stoichiometric air-fuel ratio (rich degree) is equal to or less than the difference between the lean set air-fuel ratio and stoichiometric air-fuel ratio (lean degree).

For example, the air-fuel ratio control part 51 starts the rich control when the air-fuel ratio detected by the downstream side air-fuel ratio sensor 41 rises to the lean judged air-fuel ratio leaner than the stoichiometric air-fuel ratio by the lean control. The lean judged air-fuel ratio is determined in advance and is set to a value slightly leaner than the stoichiometric air-fuel ratio (for example 14.65). The lean judged air-fuel ratio is an air-fuel ratio detected by the downstream side air-fuel ratio sensor 41 when the oxygen and $NO_X$ start to flow out from the upstream side catalyst 20.

Note that, the lean set air-fuel ratio is set to a value leaner than the lean judged air-fuel ratio. Further, the air-fuel ratio control part 51 may temporarily make the air-fuel ratio of the inflowing exhaust gas the stoichiometric air-fuel ratio between the lean control and the rich control.

Further, when controlling the air-fuel ratio of the inflowing exhaust gas, the air-fuel ratio control part 51 sets the target air-fuel ratio of the inflowing exhaust gas and controls the amount of fuel supplied to the combustion chambers 5 so that the air-fuel ratio of the inflowing exhaust gas matches the target air-fuel ratio. The air-fuel ratio control part 51 can control the amount of fuel supplied to the combustion chambers 5 by controlling the fuel injector 11 etc.

For example, the air-fuel ratio control part 51 controls the amount of fuel supplied to the combustion chambers 5 by feedback control so that the air-fuel ratio detected by the upstream side air-fuel ratio sensor 40 matches the target air-fuel ratio. In this case, the upstream side air-fuel ratio sensor 40 functions as a component of the abnormality diagnosis system 1. The air-fuel ratio control part 51 sets the target air-fuel ratio to the rich set air-fuel ratio in the rich control and sets the target air-fuel ratio to the lean set air-fuel ratio in the lean control.

Note that, the air-fuel ratio control part 51 may control the amount of fuel supplied to the combustion chambers 5 without using the upstream side air-fuel ratio sensor 40. In this case, the air-fuel ratio control part 51 supplies to the combustion chambers 5 an amount of fuel calculated from the amount of intake air detected by the air flow meter 39 etc., and the target air-fuel ratio so that the ratio of the fuel and air supplied to the combustion chambers 5 matches the target air-fuel ratio. Therefore, the upstream side air-fuel ratio sensor 40 may be omitted from the internal combustion engine 100.

When the ammonia sensor 46 is normal, after the start of the rich control, the change of the output of the ammonia sensor 46 is detected before the change of the air-fuel ratio detected by the downstream side air-fuel ratio sensor 41. For this reason, after the start of the rich control, the abnormality judgment part 52 judges that the ammonia sensor 46 is abnormal if the output value of the ammonia sensor 46 does not rise to a reference value before the air-fuel ratio detected by the downstream side air-fuel ratio sensor 41 falls to a rich judged air-fuel ratio richer than the stoichiometric air-fuel ratio. On the other hand, after the start of the rich control, the abnormality judgment part 52 judges that the ammonia sensor 46 is normal if the output value of the ammonia sensor 46 rises to the reference value before the air-fuel ratio detected by the downstream side air-fuel ratio sensor 41 falls to the rich judged air-fuel ratio richer than the stoichiometric air-fuel ratio. The abnormality diagnosis system 1 can precisely diagnose abnormality of the ammonia sensor 46 by performing the above-mentioned control.

The rich judged air-fuel ratio is determined in advance and is set to a value slightly richer than the stoichiometric air-fuel ratio (for example 14.55). The rich judged air-fuel ratio is the air-fuel ratio detected by the downstream side air-fuel ratio sensor 41 when the amount of unburned gas (HC, CO, etc.) flowing out from the upstream side catalyst 20 starts to increase. Note that, the rich set air-fuel ratio is set to a value richer than the rich judged air-fuel ratio. Further, the reference value is determined in advance and is a value corresponding to a predetermined concentration (for example 10 ppm) of ammonia in the exhaust gas. The reference value is a value detected by the ammonia sensor 46 when ammonia starts to flow out from the upstream side catalyst 20. Further, the rich judged air-fuel ratio and the reference value are set so that when the output characteristics of the downstream side air-fuel ratio sensor 41 and the ammonia sensor 46 are normal, after the start of the rich control, the output value of the ammonia sensor 46 rises to the reference value before the air-fuel ratio detected by the downstream side air-fuel ratio sensor 41 falls to the rich judged air-fuel ratio.

Further, after the start of the rich control, if the air-fuel ratio detected by the downstream side air-fuel ratio sensor 41 falls to the rich judged air-fuel ratio and the output value of the ammonia sensor 46 does not rise to the reference value, it is considered that the output of the ammonia sensor 46 is falling. For this reason, after the start of rich control, the abnormality judgment part 52 judges that the output of the ammonia detection device is falling if the output value of the ammonia sensor 46 does not rise to the reference value until a predetermined time elapses from when the air-fuel ratio detected by the downstream side air-fuel ratio sensor 41 falls to the rich judged air-fuel ratio. The predetermined time is determined in advance experimentally or theoretically and, for example, is set within the range of 1 to 5 seconds.

Further, if the output value of the ammonia sensor 46 rises to the reference value after the air-fuel ratio detected by the downstream side air-fuel ratio sensor 41 falls to the rich judged air-fuel ratio, it is considered that the response of the ammonia sensor 46 is falling. For this reason, after the start of rich control, the abnormality judgment part 52 judges that the response of the ammonia sensor 46 is falling if the output value of the ammonia sensor 46 rises to the reference value within a predetermined time from when the air-fuel ratio detected by the downstream side air-fuel ratio sensor 41 falls to the rich judged air-fuel ratio. The predetermined time is determined in advance experimentally or theoretically and, for example, is set within the range of 1 to 5 seconds.

Explanation of Abnormality Diagnosis Using Time Chart

Figure 9:
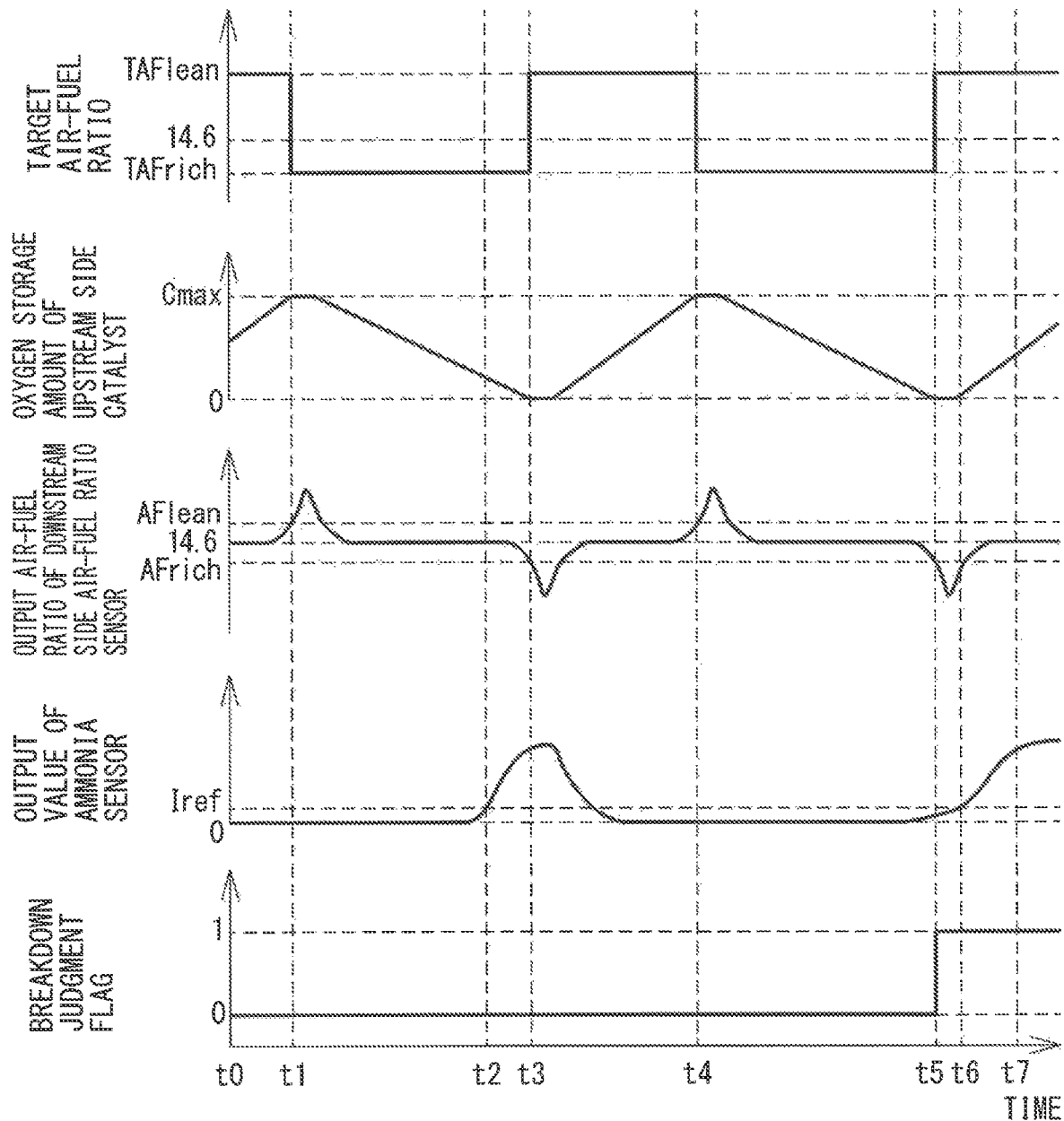
FIG. 9 is a time chart of a target air-fuel ratio of inflowing exhaust gas etc., when abnormality of an ammonia sensor is diagnosed.

Below, referring to the time chart of FIG. 9, abnormality diagnosis of the ammonia sensor 46 using the abnormality diagnosis system 1 will be specifically explained. FIG. 9 is a time chart of the target air-fuel ratio of the inflowing exhaust gas, the oxygen storage amount of the upstream side catalyst 20, the air-fuel ratio detected by the downstream side air-fuel ratio sensor 41 (output air-fuel ratio of downstream side air-fuel ratio sensor 41), the output value of the ammonia sensor 46, and the breakdown judgment flag when abnormality of the ammonia sensor 46 is diagnosed. The breakdown judgment flag is set to 1 when it is judged that the ammonia sensor 46 is abnormal.

In the illustrated example, at the time t0, the target air-fuel ratio of the inflowing exhaust gas is set to the lean set air-fuel ratio TAFlean. That is, at the time t0, the lean control is performed. For this reason, at the time t0, the oxygen storage amount of the upstream side catalyst 20 increases.

After the time t0, the oxygen storage amount of the upstream side catalyst 20 approaches the maximum storable oxygen amount Cmax and the oxygen and $NO_X$ start to flow out from the upstream side catalyst 20. As a result, at the time t1, the output air-fuel ratio of the downstream side air-fuel ratio sensor 41 rises to the lean judged air-fuel ratio AFlean. At this time, the oxygen storage amount of the upstream side catalyst 20 is the maximum storable oxygen amount Cmax.

In order to reduce the oxygen storage amount of the upstream side catalyst 20, at the time t1, the target air-fuel ratio is switched from the lean set air-fuel ratio TAFlean to the rich set air-fuel ratio TAFrich. That is, when the output air-fuel ratio of the downstream side air-fuel ratio sensor 41 rises to the lean judged air-fuel ratio AFlean, the target air-fuel ratio is switched from the lean set air-fuel ratio TAFlean to the rich set air-fuel ratio TAFrich and the rich control is started. For this reason, after the time t1, the oxygen storage amount of the upstream side catalyst 20 gradually decreases and the output air-fuel ratio of the downstream side air-fuel ratio sensor 41 falls to the stoichiometric air-fuel ratio.

If the oxygen storage amount of the upstream side catalyst 20 approaches zero, the oxidation reaction of ammonia at the upstream side catalyst 20 is suppressed and ammonia starts to flow out from the upstream side catalyst 20. As a result, the output value of the ammonia sensor 46 rises from zero and, at the time t2, reaches the reference value Iref. After that, if the oxygen storage amount of the upstream side catalyst 20 further decreases, the amount of unburned gas flowing out from the upstream side catalyst 20 rapidly increases. As a result, the output air-fuel ratio of the downstream side air-fuel ratio sensor 41 falls from the stoichiometric air-fuel ratio and, at the time t3, reaches the rich judged air-fuel ratio AFrich.

Therefore, after the start of the rich control (after the time t1), the output value of the ammonia sensor 46 rises to the reference value Iref before the air-fuel ratio detected by the downstream side air-fuel ratio sensor 41 falls to the rich judged air-fuel ratio AFrich. For this reason, at the time t3, it is judged that the ammonia sensor 46 is normal and the breakdown judgment flag is maintained at zero.

Further, in order to make the oxygen storage amount of the upstream side catalyst 20 increase and keep the unburned gas from flowing out from the upstream side catalyst 20, at the time t3, the target air-fuel ratio is switched from the rich set air-fuel ratio TAFrich to the lean set air-fuel ratio TAFlean. That is, when the output air-fuel ratio of the downstream side air-fuel ratio sensor 41 falls to the rich judged air-fuel ratio AFrich, the target air-fuel ratio is switched from the rich set air-fuel ratio TAFrich to the lean set air-fuel ratio TAFlean and the lean control is started. As a result, after the time t3, the oxygen storage amount of the upstream side catalyst 20 gradually increases. For this reason, the output air-fuel ratio of the downstream side air-fuel ratio sensor 41 rises to the stoichiometric air-fuel ratio and the output value of the ammonia sensor 46 falls to zero.

If the oxygen storage amount of the upstream side catalyst 20 again approaches the maximum storable oxygen amount Cmax, oxygen and $NO_X$ start to flow out from the upstream side catalyst 20. As a result, at the time t4, the output air-fuel ratio of the downstream side air-fuel ratio sensor 41 rises to the lean judged air-fuel ratio AFlean.

In the same way as the time t1, in order to decrease the oxygen storage amount of the upstream side catalyst 20, at the time t4, the target air-fuel ratio is switched from the lean set air-fuel ratio TAFlean to the rich set air-fuel ratio TAFrich and the rich control is started. As a result, after the time t4, the oxygen storage amount of the upstream side catalyst 20 is gradually decreased. For this reason, the output air-fuel ratio of the downstream side air-fuel ratio sensor 41 falls to the stoichiometric air-fuel ratio.

In this example, at the time t5, the output air-fuel ratio of the downstream side air-fuel ratio sensor 41 falls to the rich judged air-fuel ratio AFrich. Further, after the start of the rich control (after the time t4), the output value of the ammonia sensor 46 does not rise to the reference value Iref until the air-fuel ratio detected by the downstream side air-fuel ratio sensor 41 falls to the rich judged air-fuel ratio AFrich (until the time t5). For this reason, at the time t5, it is judged that the ammonia sensor 46 is abnormal and the breakdown judgment flag is set to 1.

Further, at the time t6 after the time t5, the output value of the ammonia sensor 46 rises to the reference value Iref. In this case, it is judged that the response of the ammonia sensor 46 is falling. Note that, if the output value of the ammonia sensor 46 does not rise to the reference value Iref until the time t7 when a predetermined time elapses from the time t5, it is judged that the output of the ammonia sensor 46 is falling.

Figure 10:
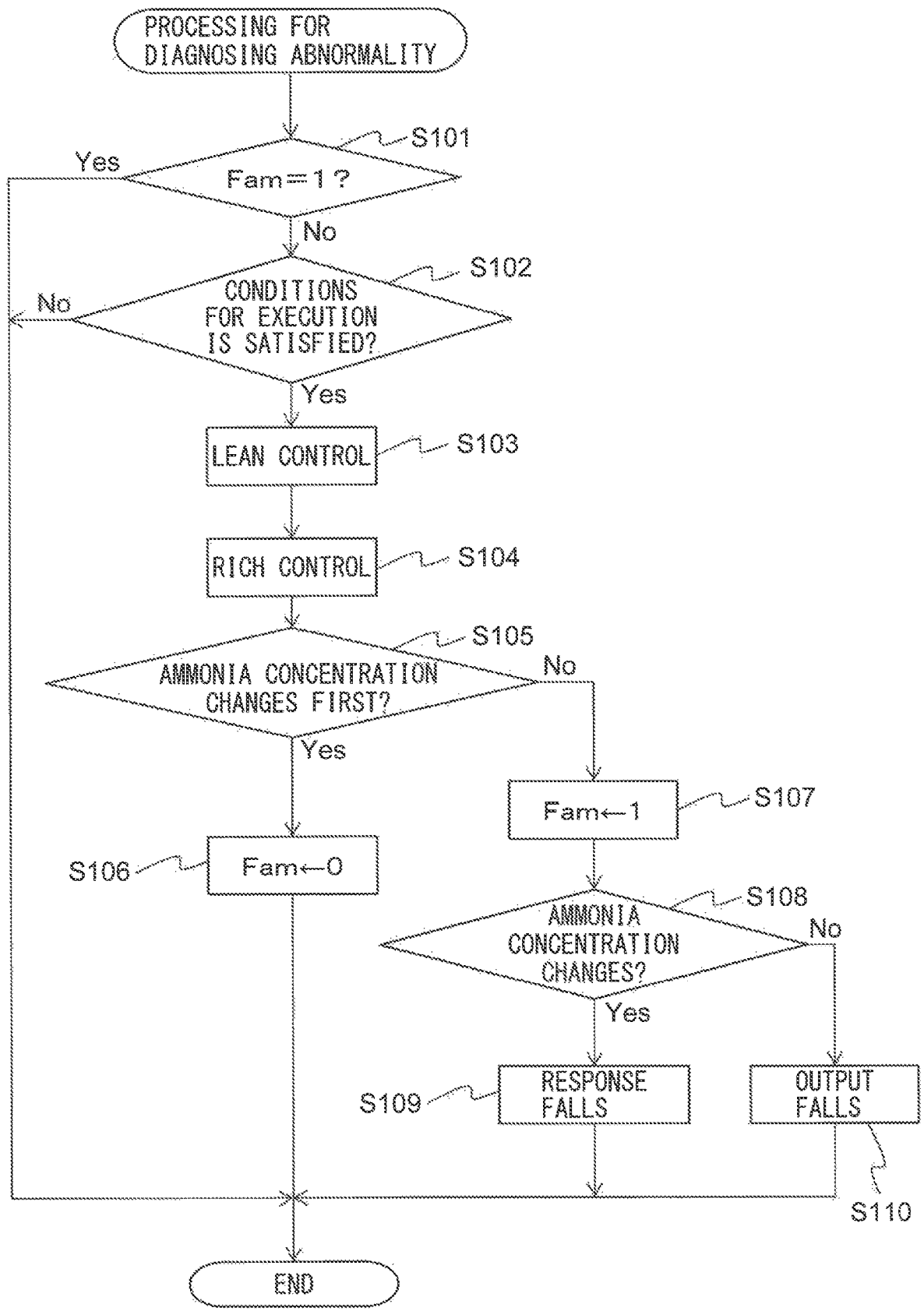
FIG. 10 is a flow chart showing a control routine of processing for diagnosing abnormality in the first embodiment of the present invention.

Processing for Diagnosing Abnormality Below, referring to the flow chart of FIG. 10, control for diagnosing abnormality of the ammonia sensor 46 by the abnormality diagnosis system 1 will be explained. FIG. 10 is a flow chart showing the control routine of processing for diagnosing abnormality in the first embodiment of the present invention. The present control routine is repeatedly performed by the ECU 31 after the startup of the internal combustion engine 100.

First, at step S101, the abnormality judgment part 52 judges whether the breakdown judgment flag Fam has been set to 1. The breakdown judgment flag Fam is a flag set to 1 when it is judged that the ammonia sensor 46 is abnormal in the present control routine. Further, the initial value of the breakdown judgment flag Fam is zero. If at step S101 it is judged that the breakdown judgment flag Fam has been set to 1, the present control routine ends without abnormality being diagnosed. On the other hand, if at step S101 it is judged that the breakdown judgment flag Fam has been set to zero, the present control routine proceeds to step S102.

At step S102, the abnormality judgment part 52 judges whether the conditions for execution are satisfied. For example, the abnormality judgment part 52 judges that the conditions for execution are satisfied if the downstream side air-fuel ratio sensor 41 and ammonia sensor 46 are activated, and judges that the conditions for execution are not satisfied if at least one of the downstream side air-fuel ratio sensor 41 and ammonia sensor 46 is not activated. The abnormality judgment part 52 judges that the downstream side air-fuel ratio sensor 41 and ammonia sensor 46 are activated if the temperatures of the sensor elements of the downstream side air-fuel ratio sensor 41 and ammonia sensor 46 are a predetermined temperature or more. The temperatures of the sensor elements are calculated based on the impedances of the sensor elements etc.

Further, abnormality of the ammonia sensor 46 may be diagnosed just once every time the internal combustion engine 100 is started up. For this reason, the abnormality judgment part 52 may judge that the conditions for execution are satisfied if abnormality is not being diagnosed after the startup of the internal combustion engine 100, and may judge that the conditions for execution are satisfied if abnormality is already being diagnosed after the startup of the internal combustion engine 100.

If at step S102 it is judged that the conditions for diagnosis of abnormality are not satisfied, the present control routine ends without abnormality being diagnosed. On the other hand, if at step S102 it is judged that the conditions for diagnosis of abnormality are satisfied, the present control routine proceeds to step S103.

At step S103, the air-fuel ratio control part 51 performs lean control making the air-fuel ratio of the inflowing exhaust gas leaner than the stoichiometric air-fuel ratio so that the oxygen storage amount of the upstream side catalyst 20 increases. Specifically, the air-fuel ratio control part 51 controls the air-fuel ratio of the inflowing exhaust gas to a lean set air-fuel ratio leaner than the stoichiometric air-fuel ratio. At this time, the air-fuel ratio control part 51 may set the target air-fuel ratio of the inflowing exhaust gas to the lean set air-fuel ratio, and control the amount of fuel supplied to the combustion chamber 5 by feedback control so that the air-fuel ratio detected by the upstream side air-fuel ratio sensor 40 matches the target air-fuel ratio.

Next, at step S104, the air-fuel ratio control part 51 performs rich control making the air-fuel ratio of the inflowing exhaust gas richer than the stoichiometric air-fuel ratio so that the oxygen storage amount of the upstream side catalyst 20 decreases. Specifically, the air-fuel ratio control part 51 controls the air-fuel ratio of the inflowing exhaust gas to a rich set air-fuel ratio richer than the stoichiometric air-fuel ratio. At this time, the air-fuel ratio control part 51 may set the target air-fuel ratio of the inflowing exhaust gas to the rich set air-fuel ratio, and control the amount of fuel supplied to the combustion chambers 5 by feedback control so that the air-fuel ratio detected by the upstream side air-fuel ratio sensor 40 matches the target air-fuel ratio.

The air-fuel ratio control part 51 starts the rich control when the air-fuel ratio detected by the downstream side air-fuel ratio sensor 41 rises to a lean judged air-fuel ratio leaner than the stoichiometric air-fuel ratio during the lean control. Further, the air-fuel ratio control part 51 ends the rich control when the air-fuel ratio detected by the downstream side air-fuel ratio sensor 41 falls to a rich judged air-fuel ratio richer than the stoichiometric air-fuel ratio. Note that, the air-fuel ratio control part 51 may end the rich control when a predetermined time elapses from when the rich control is started. In this case, the predetermined time is set so as to become longer than the time required for the air-fuel ratio detected by the downstream side air-fuel ratio sensor 41 to fall to the rich judged air-fuel ratio when the downstream side air-fuel ratio sensor 41 is normal.

Note that, the air-fuel ratio control part 51 controls the air-fuel ratio of the inflowing exhaust gas in accordance with the operating state of the internal combustion engine 100 after the end of rich control. Further, the air-fuel ratio control part 51 may make the air-fuel ratio of the inflowing exhaust gas temporarily a lean air-fuel ratio so as to keep unburned gas from flowing out from the upstream side catalyst 20 after the end of rich control.

Next, at step S105, the abnormality judgment part 52 judges whether the concentration of ammonia in the outflowing exhaust gas has changed before the air-fuel ratio of the outflowing exhaust gas changes. Specifically, after the start of rich control, the abnormality judgment part 52 judges whether the output value of the ammonia sensor 46 rises to the reference value before the air-fuel ratio detected by the downstream side air-fuel ratio sensor 41 falls to the rich judged air-fuel ratio.

If at step S105, after the start of the rich control, it is judged that the output value of the ammonia sensor 46 rises to the reference value before the air-fuel ratio detected by the downstream side air-fuel ratio sensor 41 falls to the rich judged air-fuel ratio, the present control routine proceeds to step S106. At step S106, the abnormality judgment part 52 judges that the ammonia sensor 46 is normal and sets the abnormality judgment flag Fam to zero. After step S106, the present control routine ends.

On the other hand, if at step S105, after the start of rich control, it is judged that the output value of the ammonia sensor 46 does not rise to the reference value before the air-fuel ratio detected by the downstream side air-fuel ratio sensor 41 falls to the rich judged air-fuel ratio, the present control routine proceeds to step S107. At step S107, the abnormality judgment part 52 judges that the ammonia sensor 46 is abnormal and sets the abnormality judgment flag Fam to 1. Note that, at step S107, the abnormality judgment part 52 may turn on a warning light provided at the vehicle mounting the internal combustion engine 100.

Next, at step S108, the abnormality judgment part 52 judges whether the concentration of ammonia in the outflowing exhaust gas has changed after the air-fuel ratio of the outflowing exhaust gas changes. Specifically, after the start of the rich control, the abnormality judgment part 52 judges whether the output value of the ammonia sensor 46 has risen to the reference value within a predetermined time from when the air-fuel ratio detected by the downstream side air-fuel ratio sensor 41 falls to the rich judged air-fuel ratio.

If at step S108, after the start of the rich control, it is judged that the output value of the ammonia sensor 46 has risen to the reference value within the predetermined time from when the air-fuel ratio detected by the downstream side air-fuel ratio sensor 41 falls to the rich judged air-fuel ratio, the present control routine proceeds to step S109. At step S109, the abnormality judgment part 52 judges that the response of the ammonia sensor 46 has fallen. Note that, in order to enable the mode of breakdown of the ammonia sensor 46 to be confirmed later, at step S109, the abnormality judgment part 52 may store the fact of the response of the ammonia sensor 46 falling in the RAM 33 of the ECU 31 etc. After step S109, the present control routine ends.

On the other hand, if at step S108, after the start of the rich control, it is judged that the output value of the ammonia sensor 46 does not rise to the reference value within the predetermined time from when the air-fuel ratio detected by the downstream side air-fuel ratio sensor 41 falls to the rich judged air-fuel ratio, the present control routine proceeds to step S110. At step S110, the abnormality judgment part 52 judges that the output of the ammonia sensor 46 has fallen. Note that, in order to enable the mode of breakdown of the ammonia sensor 46 to be confirmed later, at step S110, the abnormality judgment part 52 may store the fact of the output of the ammonia sensor 46 falling in the RAM 33 of the ECU 31 etc. After step S110, the present control routine ends.

Second Embodiment

The abnormality diagnosis system according to a second embodiment is basically similar in configuration and control to the abnormality diagnosis system according to the first embodiment except for the points explained below. For this reason, below, the second embodiment of the present invention will be explained focusing on the parts different from the first embodiment.

If the temperature of the upstream side catalyst 20 or outflowing exhaust gas is high, the ammonia flowing out from the upstream side catalyst 20 is decomposed by the heat of the exhaust gas. For this reason, even if the oxygen storage amount of the upstream side catalyst 20 falls and ammonia flows out from the upstream side catalyst 20, the output value of the ammonia sensor 46 sometimes will not rise to the reference value.

Figure 11:
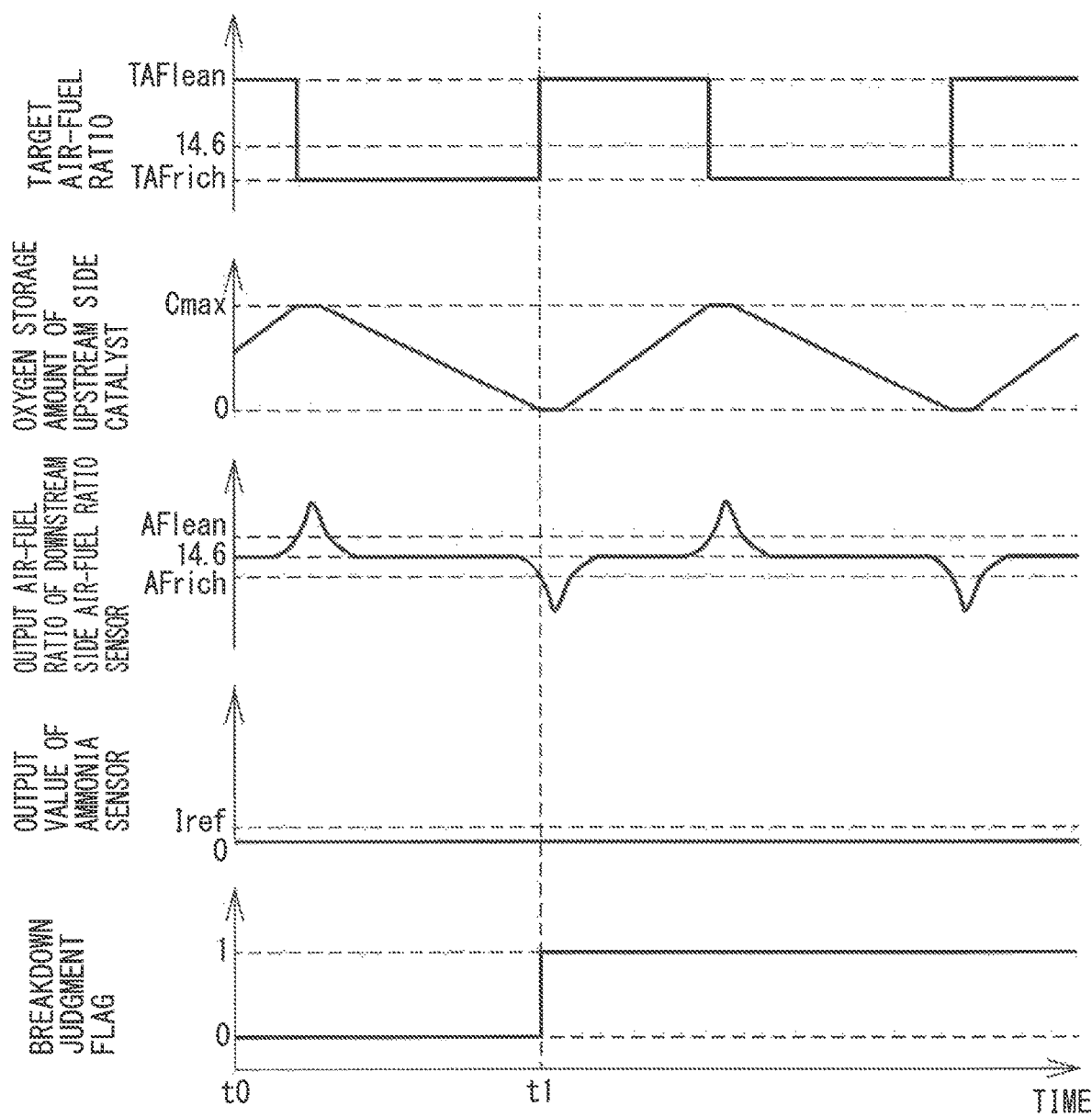
FIG. 11 is a time chart when abnormality is diagnosed in a comparative example of the present invention.

FIG. 11 is a time chart when abnormality is diagnosed in a comparative example of the present invention. The temperature of the upstream side catalyst 20 used in the time chart of FIG. 11 is higher than the temperature of the upstream side catalyst 20 used in the time chart of FIG. 9. In the example of FIG. 11, the temperature of the upstream side catalyst 20 is 785° C.

The time chart of the target air-fuel ratio of the inflowing exhaust gas, the oxygen storage amount of the upstream side catalyst 20, and the air-fuel ratio detected by the downstream side air-fuel ratio sensor 41 (output air-fuel ratio of downstream side air-fuel ratio sensor 41) of FIG. 11 is similar to the time chart shown in FIG. 9. However, in the example of FIG. 11, the ammonia is decomposed by heat, so even if the rich control is performed, the output value of the ammonia is maintained at substantially zero. For this reason, at the time t1, after the start of the rich control, when the air-fuel ratio detected by the downstream side air-fuel ratio sensor 41 falls to the rich judged air-fuel ratio AFrich, it is judged that the ammonia sensor 46 is abnormal.

Therefore, when the temperature of the upstream side catalyst 20 or outflowing exhaust gas is high, if abnormality of the ammonia sensor 46 is diagnosed, a normal ammonia sensor 46 is liable to be misjudged as abnormal. In order to eliminate this problem, in the second embodiment, when the temperature of the upstream side catalyst 20 or outflowing exhaust gas is less than the predetermined temperature, abnormality of the ammonia sensor 46 is diagnosed.

Figure 12:
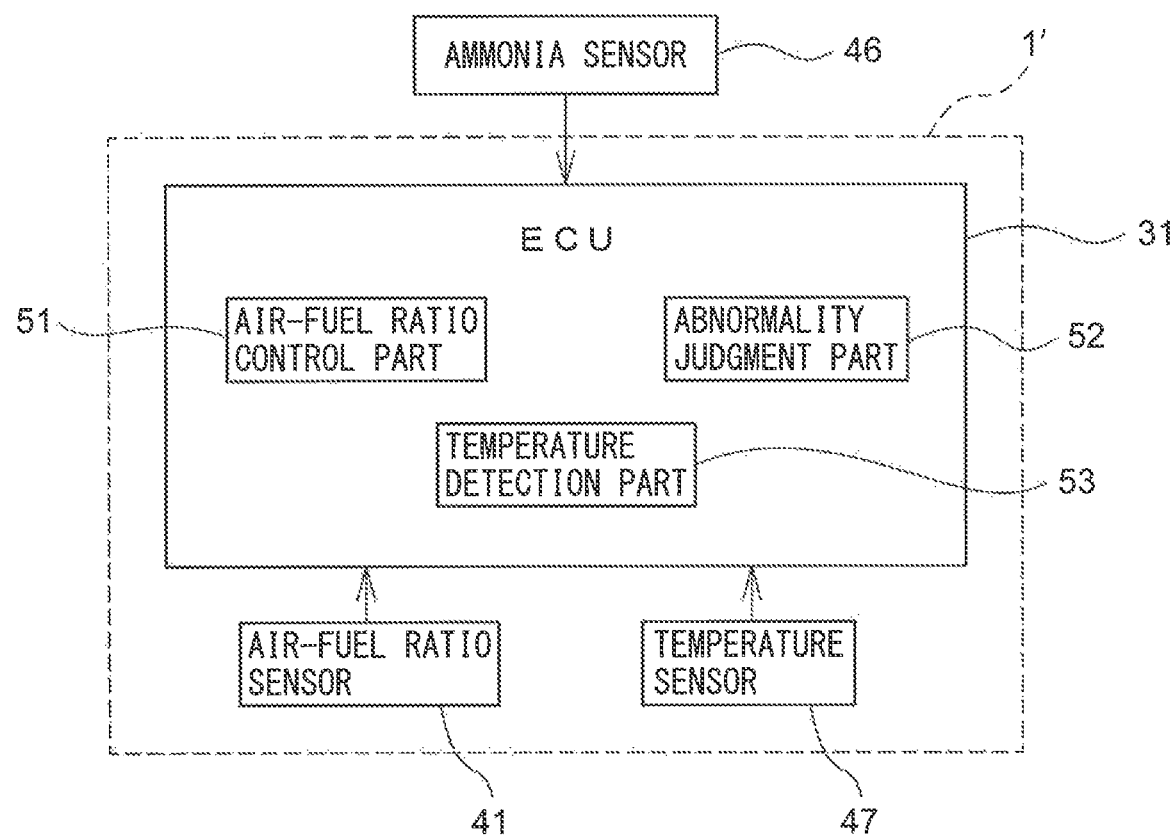
FIG. 12 is a block diagram schematically showing a configuration of an abnormality diagnosis system according to a second embodiment of the present invention.

FIG. 12 is a block diagram schematically showing the configuration of an abnormality diagnosis system 1' according to a second embodiment of the present invention. The abnormality diagnosis system 1' diagnoses abnormality of the ammonia detection device arranged in the exhaust passage of the internal combustion engine 100 at the downstream side of the upstream side catalyst 20 in the direction of flow of exhaust. The abnormality diagnosis system 1', similar to the first embodiment, is provided with the air-fuel ratio detection device, air-fuel ratio control part 51, and abnormality judgment part 52. Further, the abnormality diagnosis system 1' is provided with a temperature detection part 53 detecting or estimating the temperature of the upstream side catalyst 20 or temperature of the outflowing exhaust gas. In the second embodiment as well, the ammonia sensor 46 functions as the ammonia detection device, while the downstream side air-fuel ratio sensor 41 functions as the air-fuel ratio detection device. Further, the ECU 31 functions as the air-fuel ratio control part 51, abnormality judgment part 52, and temperature detection part 53. Note that, in the present embodiment, a single ECU 31 is provided, but a plurality of ECUs may be provided for the different functions.

For example, the temperature detection part 53 uses the temperature sensor 47 to detect the temperature of the upstream side catalyst 20 or outflowing exhaust gas. In this case, the temperature sensor 47 functions as a component of the abnormality diagnosis system 1'. If the temperature of the upstream side catalyst 20 is detected, the temperature sensor 47 is arranged at the upstream side casing 21 housing the upstream side catalyst 20. On the other hand, when the temperature of the outflowing exhaust gas is detected, the temperature sensor 47 is arranged in the exhaust passage at the downstream side of the upstream side catalyst 20 in the direction of flow of exhaust. Specifically, it is arranged in the exhaust pipe 22 between the upstream side catalyst 20 and the downstream side catalyst 24. The output of the temperature sensor 47 is sent to the ECU 31.

Note that, the temperature detection part 53 may estimate the temperature of the upstream side catalyst 20 or outflowing exhaust gas based on the operating state of the internal combustion engine 100. In this case, the abnormality diagnosis system 1 need not be provided with the temperature sensor 47. For example, the temperature detection part 53 estimates the temperature of the upstream side catalyst 20 or outflowing exhaust gas based on the amount of intake air. The amount of intake air is detected by for example the air flow meter 39. The temperature detection part 53 estimates the temperature of the upstream side catalyst 20 or outflowing exhaust gas higher the greater the amount of intake air.

In the second embodiment, the air-fuel ratio control part 51 performs the rich control when the temperature detected or estimated by the temperature detection part 53 is less than a predetermined temperature. The predetermined temperature is determined in advance experimentally or theoretically and, for example, is set within the range of 700° to 750°. In the second embodiment, due to this control, the ammonia flowing out from the upstream side catalyst 20 is kept from being decomposed by heat during diagnosis of abnormality of the ammonia sensor 46, so it is possible to more precisely diagnose abnormality of the ammonia sensor 46.

Figure 13:
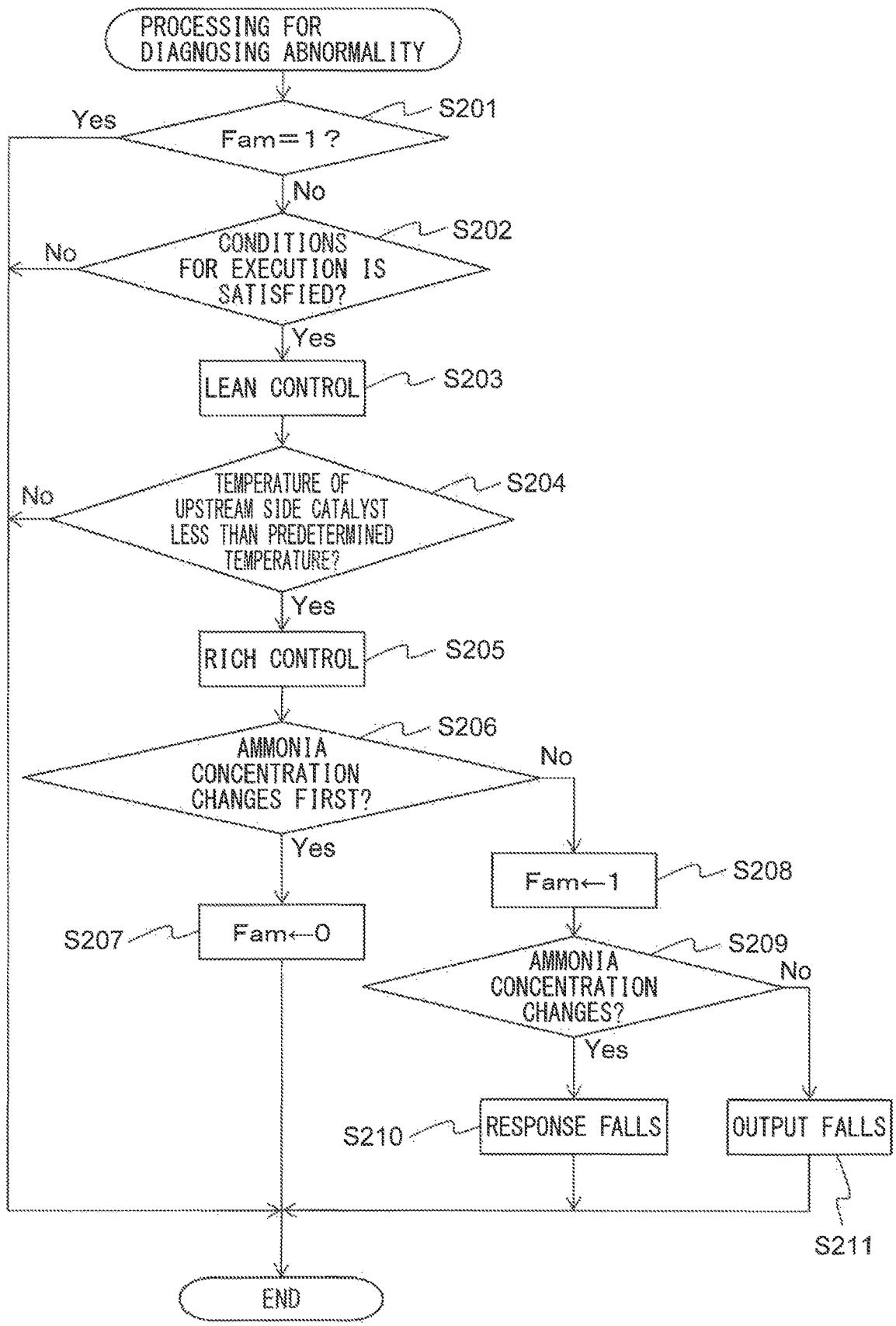
FIG. 13 is a flow chart showing a control routine of processing for diagnosing abnormality in the second embodiment of the present invention.

Processing for Diagnosing Abnormality FIG. 13 is a flow chart showing the control routine of processing for diagnosing abnormality in the second embodiment of the present invention. The present control routine is repeatedly performed by the ECU 31 after the startup of the internal combustion engine 100. Step S201 and step S202 in FIG. 13 are similar to step S101 and step S102 in FIG. 10, so explanations will be omitted.

At step S203, the air-fuel ratio control part 51 performs the lean control in the same way as the first embodiment. Further, the air-fuel ratio control part 51 ends the lean control when the air-fuel ratio detected by the downstream side air-fuel ratio sensor 41 rises to a lean judged air-fuel ratio leaner than the stoichiometric air-fuel ratio. The air-fuel ratio control part 51 controls the air-fuel ratio of the inflowing exhaust gas to the stoichiometric air-fuel ratio after the end of lean control. Due to this, oxygen and $NO_X$ are kept from flowing out from the upstream side catalyst 20, and the oxygen storage amount of the upstream side catalyst 20 can be maintained at the maximum storable oxygen amount.

Next, at step S204, the air-fuel ratio control part 51 judges whether the temperature of the upstream side catalyst 20 is less than the predetermined temperature. The temperature of the upstream side catalyst 20 is detected or estimated by the temperature detection part 53.

If at step S204 it is judged that the temperature of the upstream side catalyst 20 is the predetermined temperature or more, the present control routine ends. On the other hand, if at step S204 it is judged that the temperature of the upstream side catalyst 20 is less than the predetermined temperature, the present control routine proceeds to step S205. Step S205 to step S211 are similar to step S104 to step S110 in FIG. 10, so explanations will be omitted.

Note that, at step S204, the air-fuel ratio control part 51 may judge whether the temperature of the outflowing exhaust gas is less than the predetermined temperature. The temperature of the outflowing exhaust gas is detected or estimated by the temperature detection part 53. Further, step S204 may be performed between step S202 and step S203. That is, the air-fuel ratio control part 51 may perform the lean control and the rich control when the temperature detected or estimated by the temperature detection part 53 is less than the predetermined temperature. In this case, the lean control and the rich control are performed consecutively.

Third Embodiment

The abnormality diagnosis system according to a third embodiment is basically similar in configuration and control to the abnormality diagnosis system according to the first embodiment except for the points explained below. For this reason, below, the third embodiment of the present invention will be explained focusing on the parts different from the first embodiment.

Usually, when the internal combustion engine 100 is in the idling state, the temperature of the upstream side catalyst 20 and outflowing gas becomes low, so the ammonia flowing out from the upstream side catalyst 20 is kept from being decomposed by the heat. For this reason, in the third embodiment, the air-fuel ratio control part 51 performs the rich control when the internal combustion engine 100 is in the idling state. Due to this, it is possible to more precisely diagnose abnormality of the ammonia sensor 46. Note that, the "idling state" means the state where the accelerator opening degree is zero and the engine speed is maintained at a predetermined low speed (for example 400 to 800 rpm) by combustion of the air-fuel mixture at the combustion chambers 5.

Processing for Diagnosing Abnormality

Figure 14:
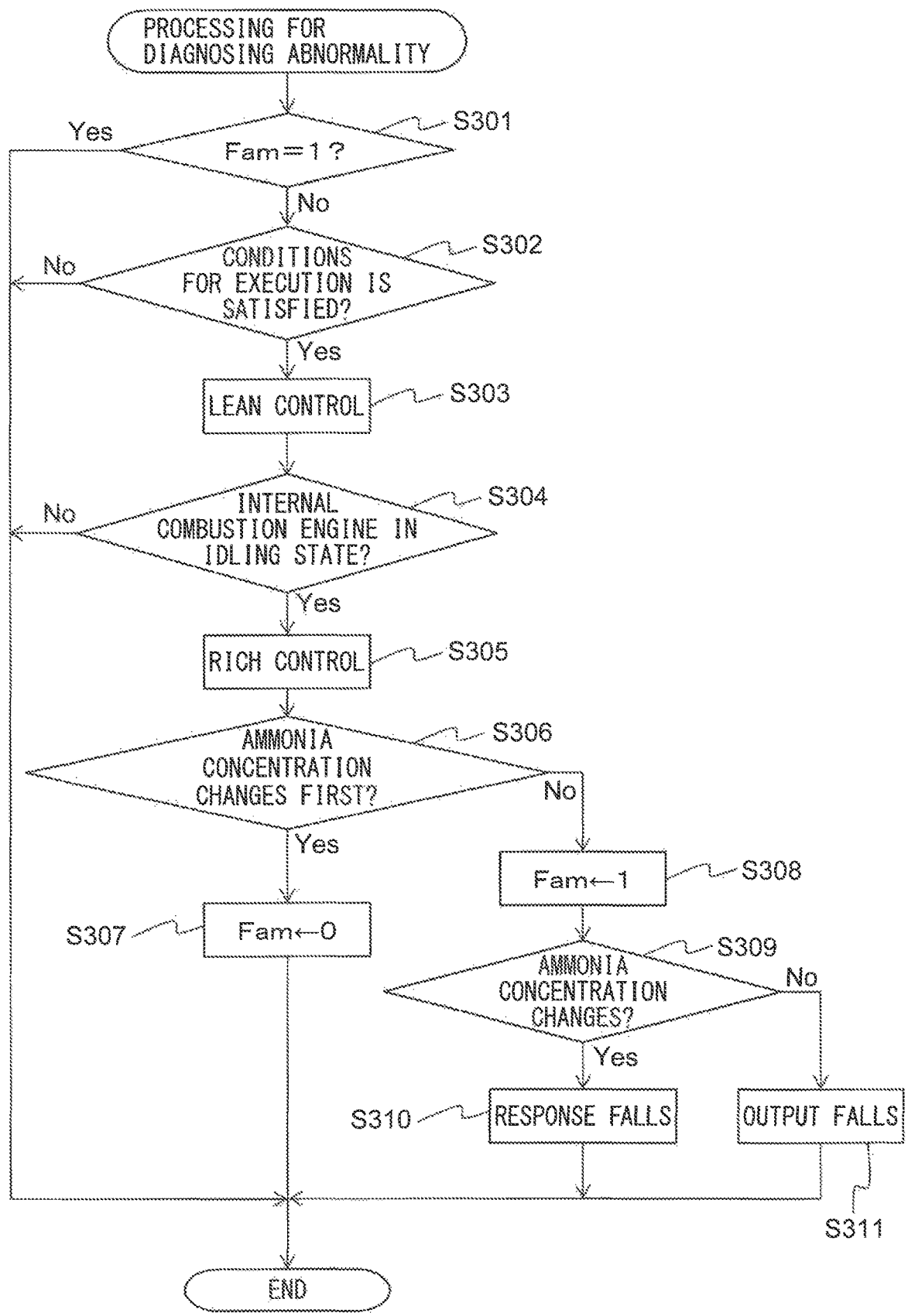
FIG. 14 is a flow chart showing a control routine of processing for diagnosing abnormality in a third embodiment of the present invention.

FIG. 14 is a flow chart showing the control routine of processing for diagnosing abnormality in the third embodiment of the present invention. The present control routine is repeatedly performed by the ECU 31 after the startup of the internal combustion engine 100. Step S301 and step S302 in FIG. 14 are similar to step S101 and step S102 in FIG. 10, so explanations will be omitted.

At step S303, the air-fuel ratio control part 51 performs the lean control in the same way as the first embodiment. Further, the air-fuel ratio control part 51 ends the lean control when the air-fuel ratio detected by the downstream side air-fuel ratio sensor 41 rises to a lean judged air-fuel ratio leaner than the stoichiometric air-fuel ratio. The air-fuel ratio control part 51 controls the air-fuel ratio of the inflowing exhaust gas to the stoichiometric air-fuel ratio after the end of the lean control. Due to this, it is possible to keep the oxygen and $NO_X$ from flowing out from the upstream side catalyst 20 while maintaining the oxygen storage amount of the upstream side catalyst 20 at the maximum storable oxygen amount.

Next, at step S304, the air-fuel ratio control part 51 judges whether the internal combustion engine 100 is in the idling state. If it is judged that the internal combustion engine 100 is not in the idling state, the present control routine ends. On the other hand, if it is judged that the internal combustion engine 100 is in the idling state, the present control routine proceeds to step S305. Step S305 to step S311 are similar to step S104 to step S110 in FIG. 10, so explanations will be omitted.

Note that, step S204 may be performed between step S202 and step S203. That is, the air-fuel ratio control part 51 may perform the lean control and the rich control when the internal combustion engine 100 is in the idling state. In this case, the lean control and the rich control are consecutively performed.

Fourth Embodiment

The abnormality diagnosis system according to a fourth embodiment is basically similar in configuration and control to the abnormality diagnosis system according to the first embodiment except for the points explained below. For this reason, below, the fourth embodiment of the present invention will be explained focusing on the parts different from the first embodiment.

As explained above, the downstream side air-fuel ratio sensor 41 also gradually deteriorates along with use in the same way as the ammonia sensor 46. If deterioration etc., causes the downstream side air-fuel ratio sensor 41 to become abnormal, the timing at which the air-fuel ratio detected by the downstream side air-fuel ratio sensor 41 falls to the rich judged air-fuel ratio due to the rich control changes or the air-fuel ratio detected by the downstream side air-fuel ratio sensor 41 does not fall to the rich judged air-fuel ratio due to the rich control. For this reason, if the downstream side air-fuel ratio sensor 41 is abnormal, it is difficult to precisely diagnose abnormality of the ammonia sensor 46.

Therefore, in the fourth embodiment, the abnormality judgment part 52 judges abnormality of the downstream side air-fuel ratio sensor 41. When judging that the downstream side air-fuel ratio sensor 41 is normal, it judges abnormality of the ammonia sensor 46. When judging that the downstream side air-fuel ratio sensor 41 is abnormal, it does not judge abnormality of the ammonia sensor 46. Due to this, it is possible to more precisely diagnose abnormality of the ammonia sensor 46. Note that, the abnormality judgment part 52 detects abnormality of the downstream side air-fuel ratio sensor 41 by a known method, for example, by detecting the output of the downstream side air-fuel ratio sensor 41 during fuel cut control.

Processing for Diagnosing Abnormality

Figure 15:
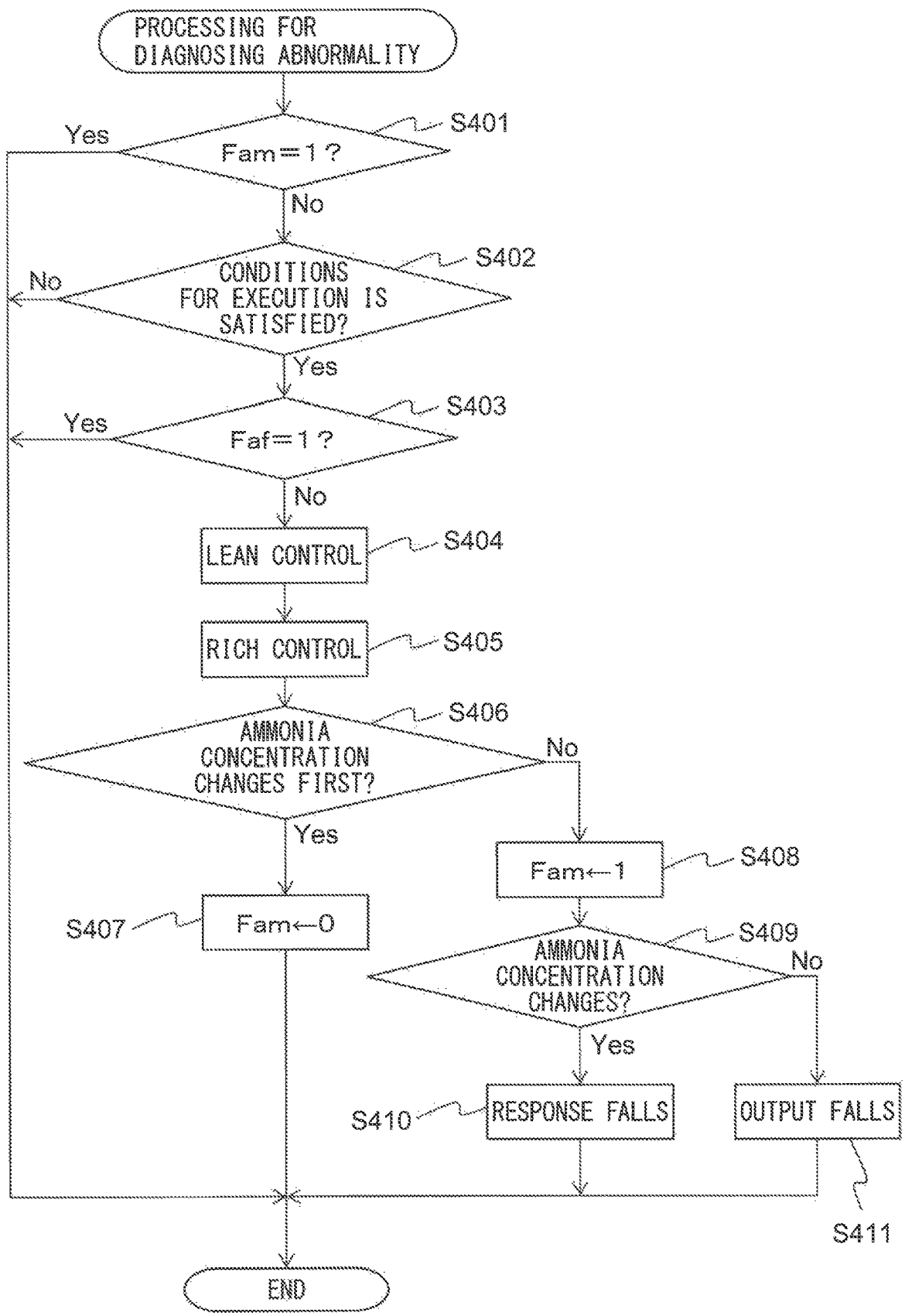
FIG. 15 is a flow chart showing a control routine of processing for diagnosis of abnormality in a fourth embodiment of the present invention.

FIG. 15 is a flow chart showing the control routine of processing for diagnosing abnormality in the fourth embodiment of the present invention. The present control routine is repeatedly performed by the ECU 31 after the startup of the internal combustion engine 100. Step S401 and step S402 in FIG. 15 are similar to step S101 and step S102 in FIG. 10, so explanations will be omitted.

At step S403, abnormality judgment part 52 judges whether an air-fuel ratio sensor abnormality flag Faf has been set to 1. The air-fuel ratio sensor abnormality flag Faf is a flag which is set to 1 when it is judged that the downstream side air-fuel ratio sensor 41 is abnormal while is set to zero when it is judged that downstream side air-fuel ratio sensor 41 is normal. Abnormality of the downstream side air-fuel ratio sensor 41 is judged in advance by the abnormality judgment part 52.

If at step S403 it is judged that the air-fuel ratio sensor abnormality flag Faf has been set to 1, the present control routine ends. On the other hand, if at step S403 it is judged that the air-fuel ratio sensor abnormality flag Faf has been set to zero, the present control routine proceeds to step S404. Step S404 to step S411 are similar to step S103 to step S110 in FIG. 10, so explanations will be omitted.

Fifth Embodiment

The abnormality diagnosis system according to a fifth embodiment is basically similar in configuration and control to the abnormality diagnosis system according to the first embodiment except for the points explained below. For this reason, below, the fifth embodiment of the present invention will be explained focusing on the parts different from the first embodiment.

If the downstream side air-fuel ratio sensor 41 completely breaks down and its output does not change, the downstream side air-fuel ratio sensor 41 cannot be used to detect the air-fuel ratio of the outflowing exhaust gas. However, if deterioration etc., causes the output or response of the downstream side air-fuel ratio sensor 41 to fall, it is possible to correct the output characteristic of the downstream side air-fuel ratio sensor 41 so as to suppress a drop in the precision of detection of the air-fuel ratio of the outflowing exhaust gas. Further, the rich judged air-fuel ratio may be corrected so as to keep the timing at which the air-fuel ratio detected by the downstream side air-fuel ratio sensor 41 falls to the rich judged air-fuel ratio due to the rich control from changing due to the fall in the output or response of the downstream side air-fuel ratio sensor 41.

For this reason, in the fifth embodiment, the abnormality judgment part 52 judges whether the downstream side air-fuel ratio sensor 41 is abnormal. If the abnormality judgment part 52 judges that the downstream side air-fuel ratio sensor 41 is abnormal, the air-fuel ratio control part 51 corrects at least one of the output characteristics of the downstream side air-fuel ratio sensor 41 and rich judged air-fuel ratio. Due to this, it is possible to more precisely diagnose abnormality of the ammonia sensor 46. Note that, abnormality of the downstream side air-fuel ratio sensor 41 is judged by a known method in the same way as the fourth embodiment.

The air-fuel ratio control part 51, for example in the following way, corrects at least one of the output characteristics of the downstream side air-fuel ratio sensor 41 and rich judged air-fuel ratio. The air-fuel ratio control part 51 increases the output of the downstream side air-fuel ratio sensor 41 if it is judged by the abnormality judgment part 52 that the output of the downstream side air-fuel ratio sensor 41 has fallen. Further, the air-fuel ratio control part 51 may make the rich judged air-fuel ratio approach the stoichiometric air-fuel ratio instead of increasing the output of the downstream side air-fuel ratio sensor 41 or together with increasing the output of the downstream side air-fuel ratio sensor 41.

Further, if the response of the downstream side air-fuel ratio sensor 41 falls, the time until the air-fuel ratio detected by the downstream side air-fuel ratio sensor 41 falls to the rich judged air-fuel ratio due to the rich control becomes longer. As opposed to this, when correcting the output characteristics of the downstream side air-fuel ratio sensor 41 so that the slant of the output of the downstream side air-fuel ratio sensor 41 becomes greater, even if the response of the downstream side air-fuel ratio sensor 41 falls, it is possible to keep the time until the air-fuel ratio detected by the downstream side air-fuel ratio sensor 41 falls to the rich judged air-fuel ratio due to the rich control from becoming longer. For this reason, the air-fuel ratio control part 51 increases the slant of the output of the downstream side air-fuel ratio sensor 41 if it is judged by the abnormality judgment part 52 that the response of the downstream side air-fuel ratio sensor 41 is falling. Further, the air-fuel ratio control part 51 may make the rich judged air-fuel ratio approach the stoichiometric air-fuel ratio instead of increasing the slant of the output of the downstream side air-fuel ratio sensor 41 or together with increasing the slant of the output of the downstream side air-fuel ratio sensor 41.

Processing for Diagnosing Abnormality

Figure 16:
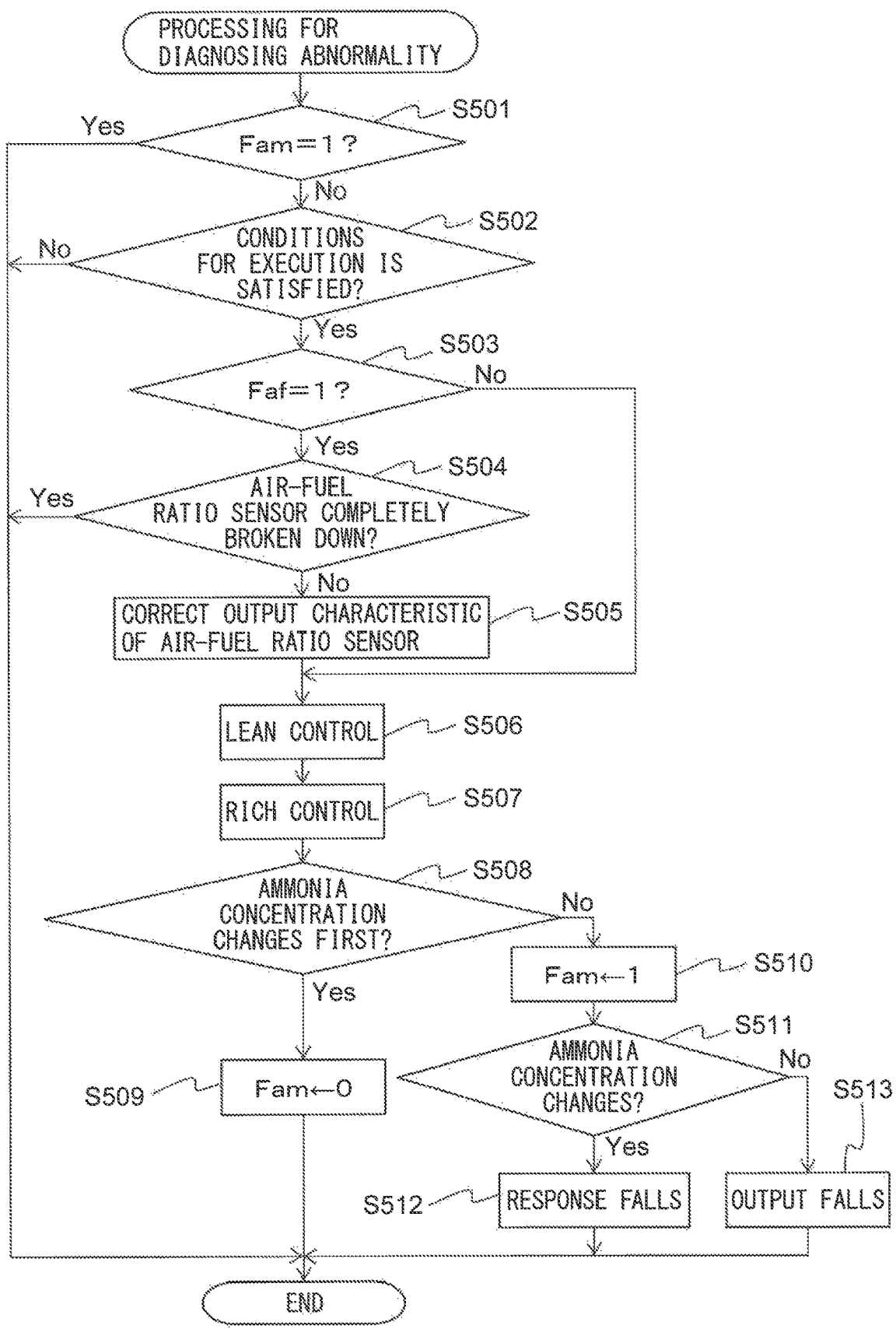
FIG. 16 is a flow chart showing a control routine of processing for diagnosing abnormality in a fifth embodiment of the present invention.

FIG. 16 is a flow chart showing the control routine of processing for diagnosis of abnormality in the fifth embodiment of the present invention. The present control routine is repeatedly performed by the ECU 31 after the startup of the internal combustion engine 100. Step S501 and step S502 in FIG. 15 are similar to step S101 and step S102 in FIG. 10, so explanations will be omitted.

At step S503, the abnormality judgment part 52, in the same way as the fourth embodiment, judges whether the air-fuel ratio sensor abnormality flag Faf has been set to 1. If it is judged that the air-fuel ratio sensor abnormality flag Faf has been set to zero, the present control routine proceeds to step S506. On the other hand, if it is judged that the air-fuel ratio sensor abnormality flag Faf has been set to 1, the present control routine proceeds to step S504.

At step S504, the abnormality judgment part 52 judges whether the downstream side air-fuel ratio sensor 41 has completely broken down. For example, the abnormality judgment part 52 judges that the downstream side air-fuel ratio sensor 41 has completely broken down if the output of the downstream side air-fuel ratio sensor 41 does not change when judging abnormality of the downstream side air-fuel ratio sensor 41. If at step S504 it is judged that the downstream side air-fuel ratio sensor 41 has completely broken down, the present control routine ends.

On the other hand, if at step S504 it is judged that the downstream side air-fuel ratio sensor 41 has not completely broken down, the present control routine proceeds to step S505. At step S505, the air-fuel ratio control part 51 corrects the output characteristics of the downstream side air-fuel ratio sensor 41 in accordance with the mode of breakdown of the downstream side air-fuel ratio sensor 41. Step S506 to step S513 after that are similar to step S103 to step S110 in FIG. 10, so explanations will be omitted.

Note that, at step S505, the air-fuel ratio control part 51 may correct the rich judged air-fuel ratio or output characteristics of the downstream side air-fuel ratio sensor 41 and the rich judged air-fuel ratio in accordance with the mode of breakdown of the downstream side air-fuel ratio sensor 41.

Sixth Embodiment

The abnormality diagnosis system according to a sixth embodiment is basically similar in configuration and control to the abnormality diagnosis system according to the first embodiment except for the points explained below. For this reason, below, the sixth embodiment of the present invention will be explained focusing on the parts different from the first embodiment.

Figure 17:
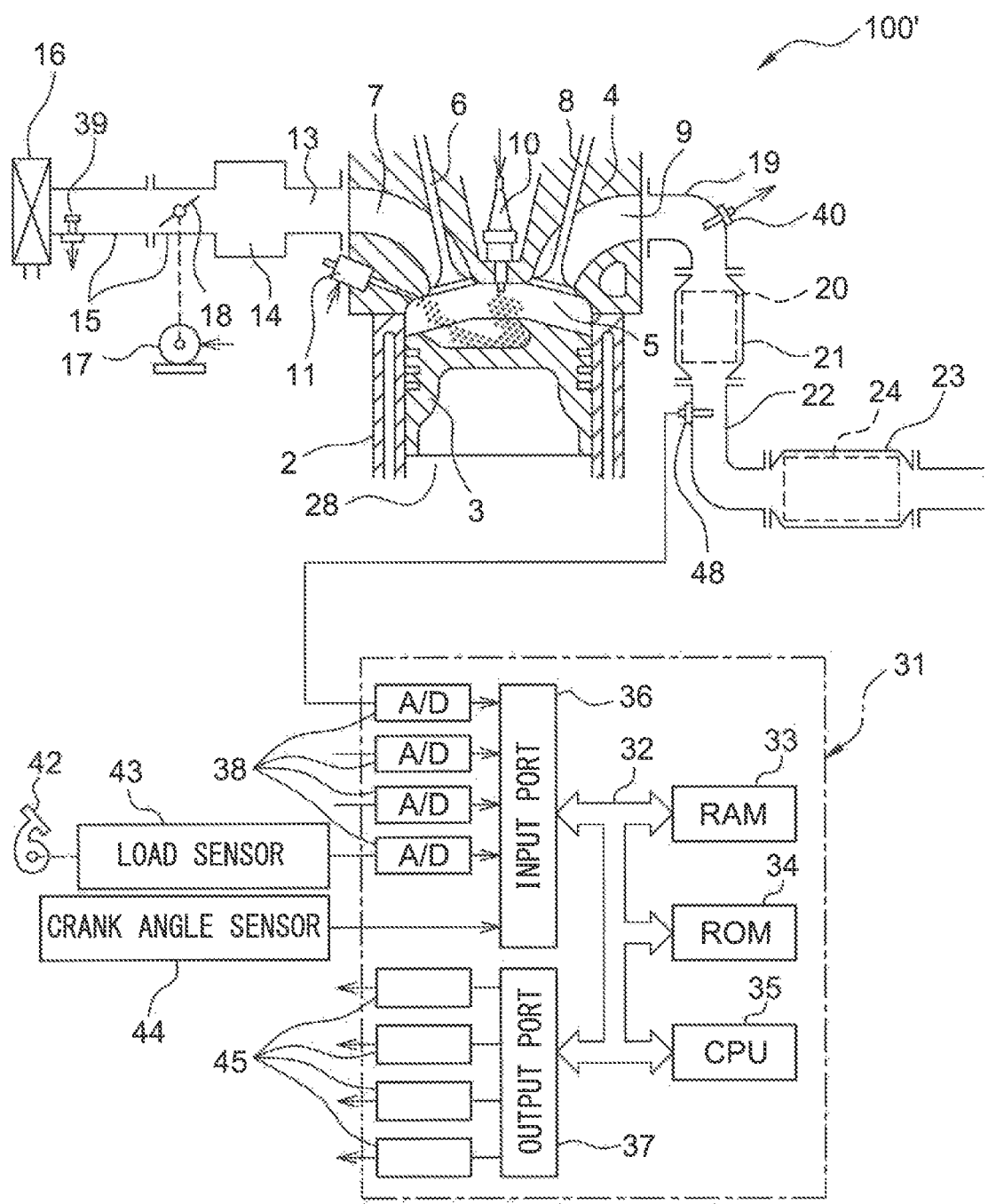
FIG. 17 is a view schematically showing an internal combustion engine provided with an abnormality diagnosis system according to a sixth embodiment of the present invention.

FIG. 17 is a view schematically showing an internal combustion engine 100' provided with an abnormality diagnosis system according to the sixth embodiment of the present invention. In the sixth embodiment, inside the exhaust pipe 22, that is, at the downstream side of the upstream side catalyst 20 in the direction of flow of exhaust, a nitrogen oxide sensor ($NO_X$ sensor) 48 detecting the concentration of nitrogen oxides ($NO_X$ concentration) in the exhaust gas flowing through the exhaust pipe 22 (that is, exhaust gas flowing out from the upstream side catalyst 20) is arranged. The $NO_X$ sensor 48 is arranged between the upstream side catalyst 20 and the downstream side catalyst 24 in the direction of flow of exhaust. The output of the $NO_X$ sensor 48 is input through the corresponding AD converter 38 to the input port 36.

In the present embodiment, the $NO_X$ sensor 48 is a limit current type $NO_X$ sensor calculating an $NO_X$ concentration in the exhaust gas by detecting a limit current flowing in the sensor when applying a predetermined voltage. The $NO_X$ sensor 48 itself is known, so below the configuration of the $NO_X$ sensor 48 and the principle of detection of the $NO_X$ will be briefly explained.

Figure 18:
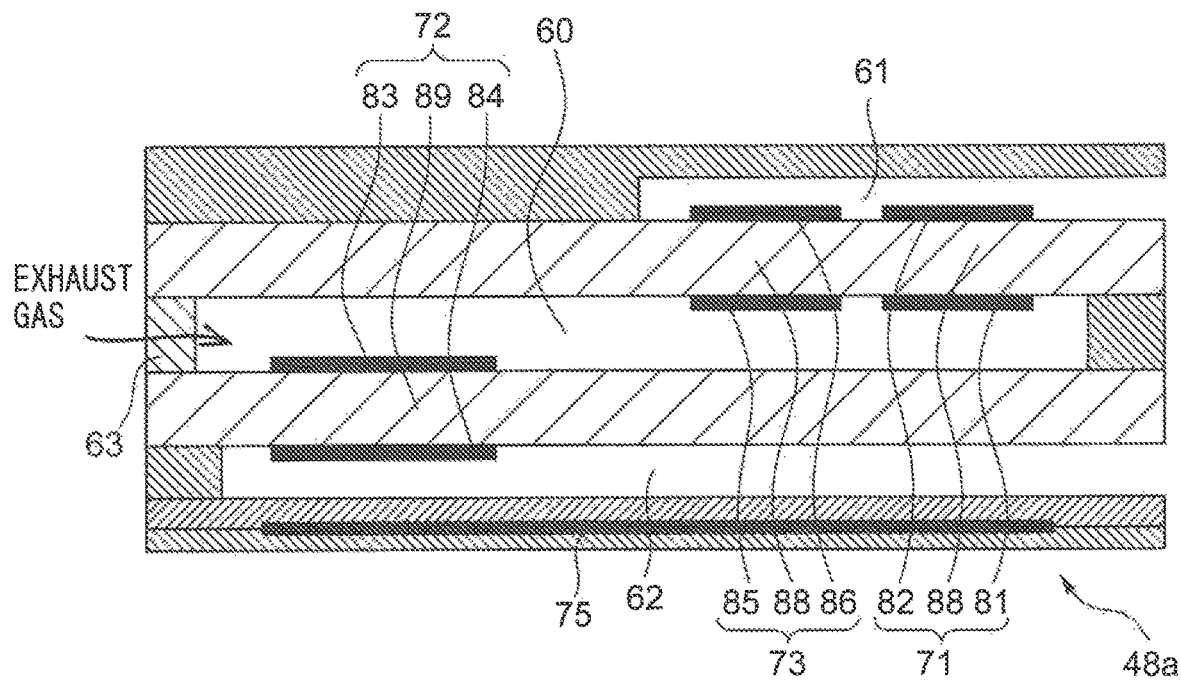
FIG. 18 is a cross-sectional view of a sensor element of an $NO_X$ sensor.

FIG. 18 is a cross-sectional view of a sensor element 48a of an $NO_X$ sensor 48. As shown in FIG. 18, the sensor element 48a of the $NO_X$ sensor 48 is provided with a measured gas chamber 60, first reference gas chamber 61, second reference gas chamber 62, sensor cell 71, pump cell 72, monitor cell 73, and heater 75. In the measured gas chamber 60, outflowing exhaust gas is introduced as measured gas through the diffusion regulating layer 63. In the first reference gas chamber 61 and second reference gas chamber 62, reference gas is introduced. The reference gas is for example air. In this case, the first reference gas chamber 61 and the second reference gas chamber 62 are opened to the atmosphere.

The sensor cell 71 is an electrochemical cell having a sensor solid electrolyte layer, first electrode 81, and second electrode 82. In the present embodiment, the first solid electrolyte layer 88 functions as the sensor solid electrolyte layer. The first electrode 81 is arranged on the surface of the measured gas chamber 60 side of the first solid electrolyte layer 88 so as to be exposed to the measured gas inside the measured gas chamber 60. On the other hand, the second electrode 82 is arranged on the surface of the first reference gas chamber 61 side of the first solid electrolyte layer 88 so as to be exposed to the reference gas inside the first reference gas chamber 61. The first electrode 81 and second electrode 82 are arranged so as to face each other across the first solid electrolyte layer 88. The first electrode 81 is comprised of a material having an $NO_X$ decomposition function.

The pump cell 72 is an electrochemical cell having a pump solid electrolyte layer, third electrode 83, and fourth electrode 84. In the present embodiment, the second solid electrolyte layer 89 functions as the pump solid electrolyte layer. The third electrode 83 is arranged on the surface of the measured gas chamber 60 side of the second solid electrolyte layer 89 so as to be exposed to the measured gas inside the measured gas chamber 60. On the other hand, the fourth electrode 84 is arranged on the surface of the second reference gas chamber 62 side of the second solid electrolyte layer 89 so as to be exposed to the reference gas inside the second reference gas chamber 62. The third electrode 83 and the fourth electrode 84 are arranged so as to face each other across the second solid electrolyte layer 89. The third electrode 83 is comprised of a material not having an $NO_X$ decomposition function.

The monitor cell 73 is an electrochemical cell having a monitor solid electrolyte layer, fifth electrode 85, and sixth electrode 86. In the present embodiment, the first solid electrolyte layer 88 functions as the monitor solid electrolyte layer. Therefore, in the present embodiment, the sensor solid electrolyte layer and monitor solid electrolyte layer are made from a common solid electrolyte layer. The fifth electrode 85 is arranged on the surface of the measured gas chamber 60 side of the first solid electrolyte layer 88 so as to be exposed to the measured gas inside the measured gas chamber 60. On the other hand, the sixth electrode 86 is arranged on the surface of the first reference gas chamber 61 side of the first solid electrolyte layer 88 so as to be exposed to the reference gas inside the first reference gas chamber 61. The fifth electrode 85 and the sixth electrode 86 are arranged so as to face each other across the first solid electrolyte layer 88. The fifth electrode 85 is comprised of a material not having an $NO_X$ decomposition function.

As shown in FIG. 18, the pump cell 72 is arranged at the upstream side from the sensor cell 71 in the direction of flow of the measured gas. The monitor cell 73 is arranged between the pump cell 72 and sensor cell 71 in the direction of flow of the measured gas. The heater 75 heats the sensor element 48a, in particular, the sensor cell 71, pump cell 72, and monitor cell 73.

Note that, the specific configuration of the sensor element 48a may differ from the configuration shown in FIG. 18. For example, the sensor solid electrolyte layer, pump solid electrolyte layer, and monitor solid electrolyte layer may be a common solid electrolyte layer or separate solid electrolyte layers.

The $NO_X$ concentration in the measured gas is detected as follows using the $NO_X$ sensor 48. The outflowing exhaust gas passes through the diffusion regulating layer 63 and is introduced into the measured gas chamber 60 as measured gas. The measured gas introduced to the inside of the measured gas chamber 60 first reaches the pump cell 72.

The measured gas (exhaust gas) includes not only $NO_X$ (NO and $NO_2$), but also oxygen. If the measured gas reaching the sensor cell 71 contains oxygen, current flows to the sensor cell 71 due to the oxygen pumping action. For this reason, if the concentration of oxygen in the measured gas fluctuates, the output of the sensor cell 71 also fluctuates and the precision of detection of the $NO_X$ concentration falls. For this reason, in order to make the concentration of oxygen in the measured gas reaching the sensor cell 71 constant, the oxygen in the measured gas is discharged by the pump cell 72 into the second reference gas chamber 62.

A predetermined voltage is applied to the pump cell 72. As a result, the oxygen in the measured gas becomes oxide ions at the third electrode 83. The oxide ions move through the pump solid electrolyte layer (in the present embodiment, second solid electrolyte layer 89) from the third electrode (cathode) 83 to the fourth electrode (anode) 84 and are discharged into the second reference gas chamber 62 (oxygen pumping action). Therefore, the pump cell 72 can discharge oxygen in the measured gas into the second reference gas chamber 62. Further, current corresponding to the concentration of oxygen in the measured gas flows to the pump cell 72. For this reason, by detecting the output of the pump cell 72, it is possible to detect the concentration of oxygen in the measured gas and in turn detect the air-fuel ratio of the measured gas. Therefore, the pump cell 72 can detect the air-fuel ratio of the outflowing exhaust gas.

Further, if the concentration of oxygen in the measured gas is sufficiently reduced by the pump cell 72, the reaction $2NO_2 \rightarrow 2NO+O_2$ occurs and the $NO_2$ in the measured gas is reduced to NO. Therefore, before the measured gas reaches the sensor cell 71, the $NO_X$ in the measured gas is converted to NO.

The measured gas passing through the pump cell 72 next reaches the monitor cell 73. The monitor cell 73 detects the residual concentration of oxygen in the measured gas. A predetermined voltage is applied to the monitor cell 73. As a result, current corresponding to the concentration of oxygen in the measured gas flows to the monitor cell 73 due to the oxygen pumping action. For this reason, by detecting the output of the monitor cell 73, it is possible to detect the residual concentration of oxygen in the measured gas. The voltage applied to the pump cell 72 is feedback controlled based on the output of the monitor cell 73 so that the residual concentration of oxygen becomes a predetermined low concentration. As a result, the concentration of oxygen in the measured gas reaching the sensor cell 71 is controlled to a certain value.

The measured gas passing through the monitor cell 73 next reaches the sensor cell 71. The sensor cell 71 detects the concentration of $NO_X$ in the measured gas by decomposing the NO in the measured gas. A predetermined voltage is applied to the sensor cell 71. As a result, the NO in the measured gas is decomposed by reduction in the first electrode 81 and oxide ions are produced. The oxide ions move through the sensor solid electrolyte layer (in the present embodiment, first solid electrolyte layer 88) from the first electrode (cathode) 81 to the second electrode (anode) 82 and are discharged into the first reference gas chamber 61. Before the measured gas reaches the sensor cell 71, the $NO_2$ in the measured gas is converted to NO, so current corresponding to the concentration of $NO_X$ (NO and $NO_2$) in the measured gas due to decomposition of NO flows in the sensor cell 71. For this reason, by detecting the output of the sensor cell 71, it is possible to detect the concentration of $NO_X$ in the measured gas. Therefore, the sensor cell 71 can detect the concentration of $NO_X$ in the outflowing exhaust gas.

Note that, if able to remove almost all of the oxygen in the measured gas by the pump cell 72 or if able to make the concentration of oxygen in the measured gas by the pump cell 72 a substantially constant low concentration, it is not necessary to detect the residual concentration of oxygen in the measured gas by the monitor cell 73. For this reason, $NO_X$ sensor 48 may detect the concentration of $NO_X$ in the measured gas by the pump cell 72 and sensor cell 71 without being provided with the monitor cell 73.

Abnormality Diagnosis System

Figure 19:
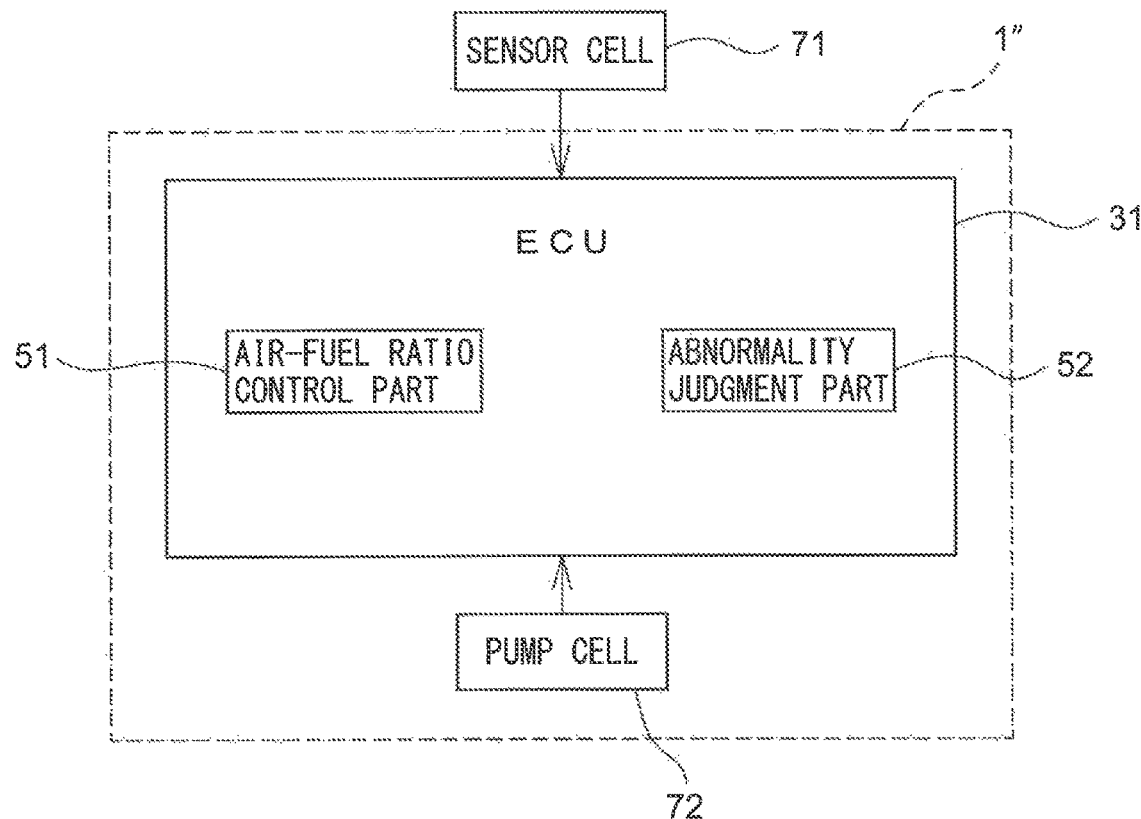
FIG. 19 is a block diagram schematically showing a configuration of an abnormality diagnosis system according to the sixth embodiment of the present invention.

Below, an abnormality diagnosis system according to the sixth embodiment of the present invention will be explained. FIG. 19 is a block diagram schematically showing the configuration of the abnormality diagnosis system 1" according to the sixth embodiment of the present invention. The abnormality diagnosis system 1" diagnoses abnormality of the ammonia detection device arranged in the exhaust passage of the internal combustion engine 100' at the downstream side of the upstream side catalyst 20 in the direction of flow of exhaust. The abnormality diagnosis system 1", in the same way as the first embodiment, is provided with the air-fuel ratio detection device, air-fuel ratio control part 51, and abnormality judgment part 52.

The sensor cell 71 of the $NO_X$ sensor 48 decomposes the $NO_X$ in the measured gas and also ammonia in the measured gas, since the material forming the first electrode 81 also has an ammonia decomposition function. For this reason, if the outflowing exhaust gas contains ammonia and does not contain almost any $NO_X$, just a current corresponding to the concentration of ammonia in the outflowing exhaust gas due to the decomposition of ammonia flows in the sensor cell 71. Therefore, the sensor cell 71 can detect the concentration of ammonia in the outflowing exhaust gas. Further, as explained above, the pump cell 72 of the $NO_X$ sensor 48 can detect the air-fuel ratio of the outflowing exhaust gas.

For this reason, in the sixth embodiment, the sensor cell 71 of the $NO_X$ sensor 48 functions as the ammonia detection device, while the pump cell 72 of the $NO_X$ sensor 48 functions as the air-fuel ratio detection device. Further, the ECU 31 functions as the air-fuel ratio control part 51 and abnormality judgment part 52. Note that, in the present embodiment, a single ECU 31 is provided, but a plurality of ECUs may be provided for the different functions.

The abnormality diagnosis system 1" diagnoses abnormality of the sensor cell 71 by a method similar to the first embodiment. However, the output of the sensor cell 71 rises not only when ammonia flows out from the upstream side catalyst 20, but also when $NO_X$ flows out from the upstream side catalyst 20. For this reason, in order to precisely diagnose abnormality of the sensor cell 71, it is necessary to differentiate between output due to decomposition of ammonia and output due to decomposition of $NO_X$.

In the sixth embodiment, in the same way as the first embodiment, the air-fuel ratio control part 51 starts the rich control when the air-fuel ratio detected by the downstream side air-fuel ratio sensor 41 rises to the lean judged air-fuel ratio due to the lean control. In this case, when switching the air-fuel ratio control, $NO_X$ flows out from the upstream side catalyst 20 and the output of the sensor cell 71 rises. If the sensor cell 71 is normal, before the start of the rich control, the output value of the sensor cell 71 rises to a reference value due to decomposition of the $NO_X$ in the outflowing exhaust gas. On the other hand, if the sensor cell 71 is abnormal, after the start of the rich control, the output value of the sensor cell 71 is liable to rise to the reference value due to decomposition of $NO_X$ in the outflowing exhaust gas. For this reason, in the sixth embodiment, in order to prevent mistaken judgment that an abnormal sensor cell 71 is normal, the abnormality judgment part 52 judges abnormality of the sensor cell 71 in the following way.

After the start of the rich control, the abnormality judgment part 52 judges that the sensor cell 71 is abnormal if the output value of the sensor cell 71 does not rise to the reference value within a predetermined time period before the air-fuel ratio detected by the pump cell 72 falls to the rich judged air-fuel ratio. On the other hand, after the start of the rich control, the abnormality judgment part 52 judges that the ammonia sensor 46 is normal if the output value of the sensor cell 71 rises to the reference value within the predetermined time period before the air-fuel ratio detected by the pump cell 72 falls to the rich judged air-fuel ratio. The predetermined time period is determined experimentally or theoretically. Further, the predetermined time period is set to a time period after the timing at which the output value of the sensor cell 71 rises to the reference value due to decomposition of $NO_X$ in the outflowing exhaust gas after the start of the rich control if the sensor cell 71 is abnormal.

Explanation of Abnormality Diagnosis Using Time Chart

Figure 20:
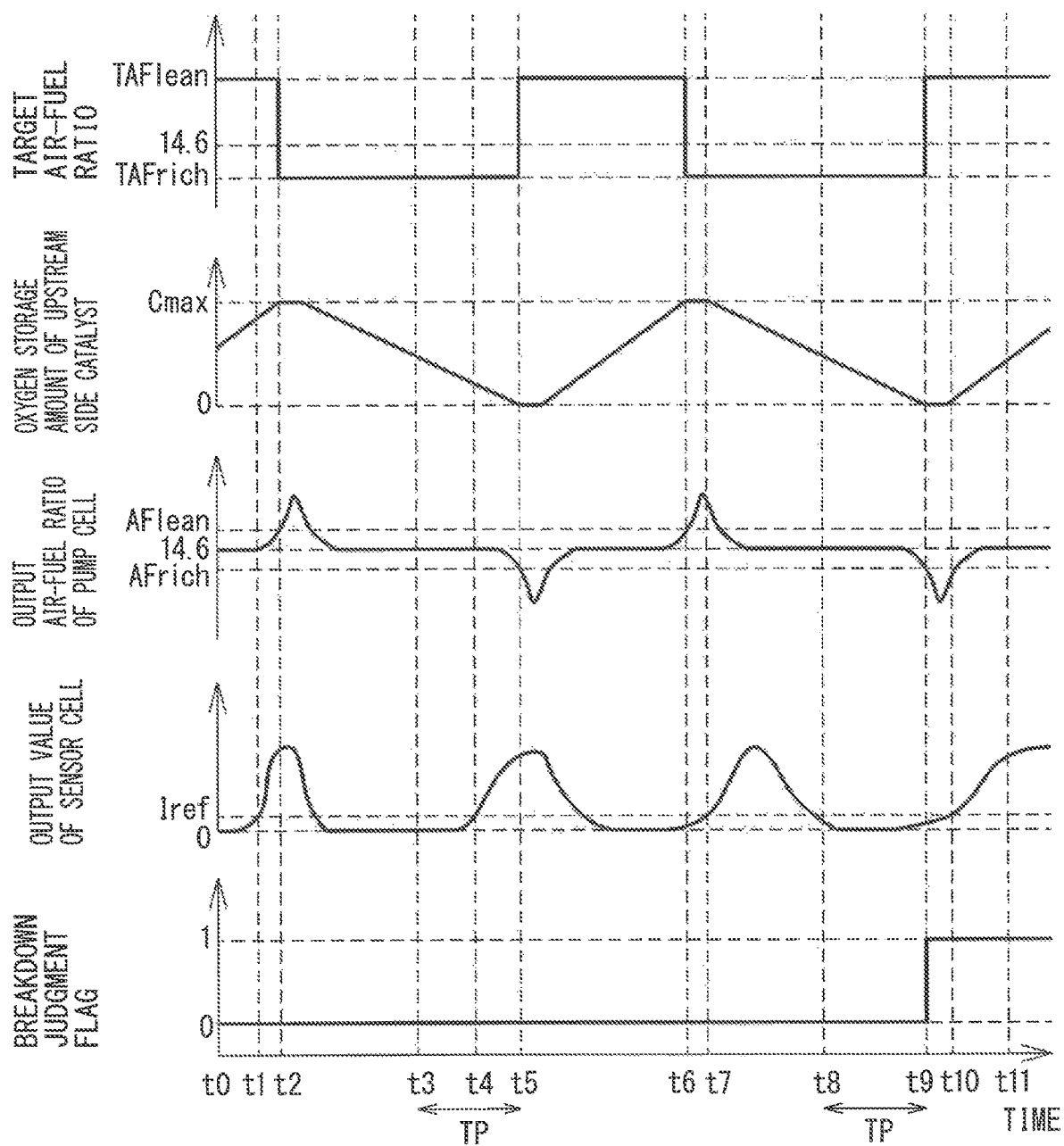
FIG. 20 is a time chart of a target air-fuel ratio of inflowing exhaust gas etc., when abnormality of a sensor cell is diagnosed.

Below, referring to the time chart of FIG. 20, abnormality diagnosis of the sensor cell 71 of the $NO_X$ sensor 48 using the abnormality diagnosis system 1" will be specifically explained. FIG. 20 is a time chart of the target air-fuel ratio of the inflowing exhaust gas, the oxygen storage amount of the upstream side catalyst 20, the air-fuel ratio detected by the pump cell 72 (output air-fuel ratio of pump cell 72), the output value of the sensor cell 71, and the breakdown judgment flag when abnormality of the sensor cell 71 is diagnosed. The breakdown judgment flag is set to 1 when it is judged that the sensor cell 71 is abnormal.

The time chart of FIG. 20 of the target air-fuel ratio of the inflowing exhaust gas, the oxygen storage amount of the upstream side catalyst 20, and the air-fuel ratio detected by the pump cell 72 (output air-fuel ratio of pump cell 72) is similar to the time chart of FIG. 9 of the target air-fuel ratio of the inflowing exhaust gas, the oxygen storage amount of the upstream side catalyst 20, and the air-fuel ratio detected by the downstream side air-fuel ratio sensor 41 (output air-fuel ratio of downstream side air-fuel ratio sensor 41). On the other hand, in the example shown in FIG. 20, when $NO_X$ flows out from the upstream side catalyst 20, due to decomposition of $NO_X$, the output value of the sensor cell 71 rises.

In the example of FIG. 20, at the time t1 before the rich control is started (before time t2), due to decomposition of the $NO_X$, the output value of the sensor cell 71 rises to the reference value Iref. When the rich control is started at the time t2, outflow of $NO_X$ from the upstream side catalyst 20 is suppressed, so the output value of the sensor cell 71 rises to the peak value, then falls to zero. After that, at the time t4, due to decomposition of ammonia, the output value of the sensor cell 71 rises to the reference value Iref. Further, at the time t5 after the time t4, the output air-fuel ratio of the pump cell 72 falls to the rich judged air-fuel ratio AFrich.

Therefore, after the start of the rich control (after the time t2), the output value of the sensor cell 71 rises to the reference value Iref within a predetermined time period (time t3 to time t5) before the air-fuel ratio detected by the pump cell 72 falls to the rich judged air-fuel ratio AFrich.

For this reason, at the time t5, it is judged that the sensor cell 71 is normal and the breakdown judgment flag is maintained at zero.

After the lean control is started at the time t5, the outflow of ammonia from the upstream side catalyst 20 is suppressed, so the output value of the sensor cell 71 falls to zero. After that, at the time t6, the output air-fuel ratio of the pump cell 72 rises to the lean judged air-fuel ratio and the rich control is started. Further, at the time t7 after the start of the rich control, due to decomposition of the $NO_X$, the output value of the sensor cell 71 rises to the reference value Iref. After that, the output value of the sensor cell 71 rises to the peak value, then falls to zero.

After the start of the rich control (after the time t6), at the time t9, the output air-fuel ratio of the pump cell 72 falls to the rich judged air-fuel ratio AFrich. In this example, after the start of the rich control (after the time t6), the output value of the sensor cell 71 does not rise to the reference value Iref within the predetermined time period TP (time t8 to time t9) before the air-fuel ratio detected by the pump cell 72 falls to the rich judged air-fuel ratio AFrich. For this reason, at the time t9, it is judged that the sensor cell 71 is abnormal and the breakdown judgment flag is set to 1.

Further, at the time t10 after time t9, the output value of the sensor cell 71 rises to the reference value Iref. In this case, it is judged that the response of the sensor cell 71 is falling. Note that, even if the output value of the sensor cell 71 does not rise to the reference value Iref until a predetermined time has elapsed from the time t9 at the time t11, it is judged that the output of the sensor cell 71 is falling.

Figure 21:
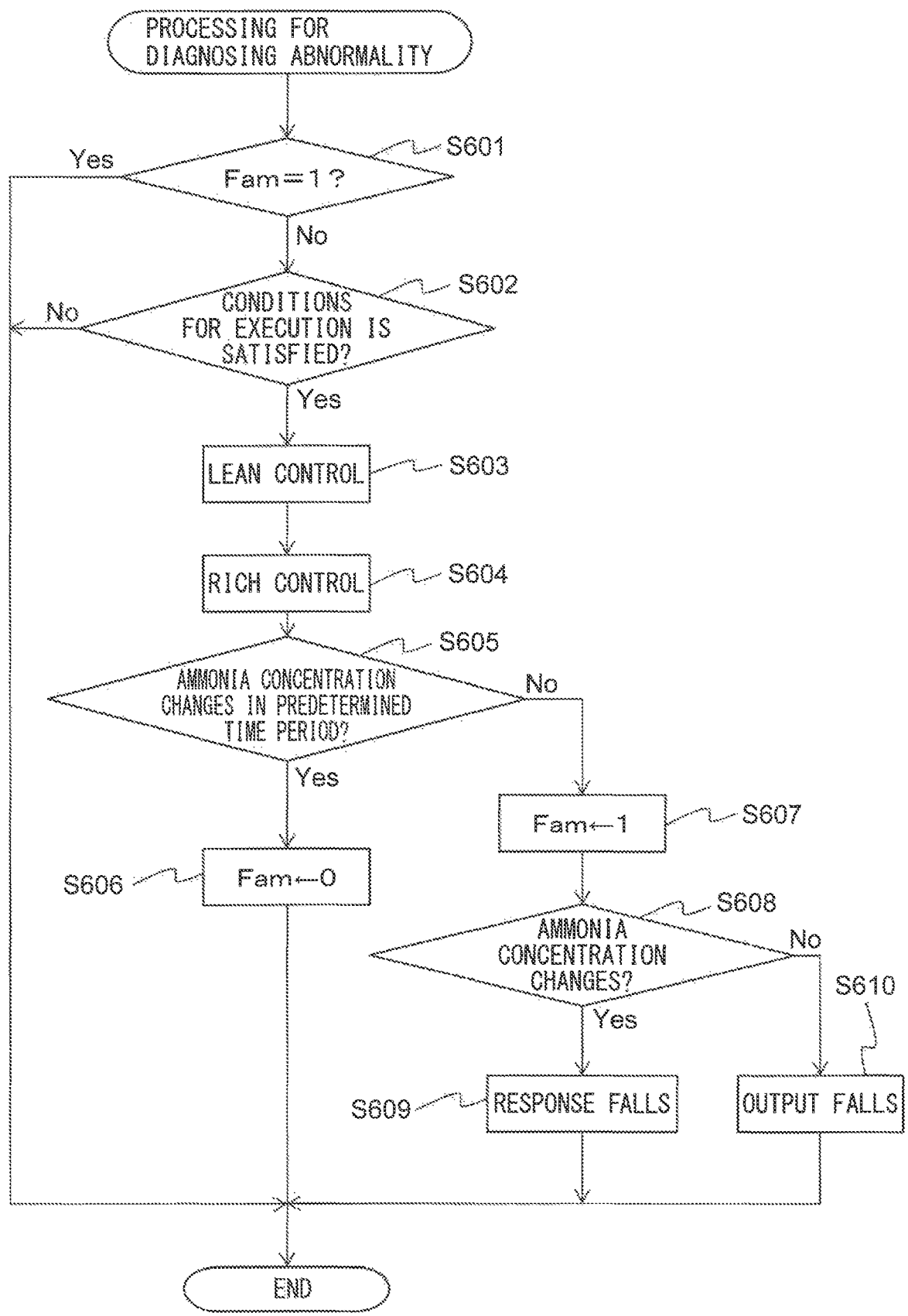
FIG. 21 is a flow chart showing a control routine of processing for diagnosing abnormality in the sixth embodiment of the present invention.

Processing for Diagnosing Abnormality FIG. 21 is a flow chart showing a routine for control of processing for diagnosing abnormality in the sixth embodiment of the present invention. The present control routine is repeatedly performed by the ECU 31 after the startup of the internal combustion engine 100'. Step S601 to step S604 in FIG. 21 are similar to step S101 to step S104 in FIG. 10 except that the sensor cell 71 and pump cell 72 are used as the ammonia detection device and air-fuel ratio detection device, so explanations will be omitted.

At step S605, the abnormality judgment part 52 judges whether the ammonia concentration in the outflowing exhaust gas has changed within a predetermined time period. Specifically, after the start of the rich control, the abnormality judgment part 52 judges whether the output value of the sensor cell 71 has risen to a reference value within a predetermined time period before the air-fuel ratio detected by the pump cell 72 falls to the rich judged air-fuel ratio.

At step S605, if after the start of the rich control, it is judged that the output value of the sensor cell 71 has risen to the reference value in the predetermined time period before the air-fuel ratio detected by the pump cell 72 falls to the rich judged air-fuel ratio, the present control routine proceeds to step S606. On the other hand, if at step S605, after the start of the rich control, it is judged that the output value of the sensor cell 71 has not risen to the reference value within the predetermined time period before the air-fuel ratio detected by the pump cell 72 falls to the rich judged air-fuel ratio, the present control routine proceeds to step S607. Step S606 to step S610 in FIG. 21 are similar to step S106 to step S110 in FIG. 10 except that the sensor cell 71 and pump cell 72 are used as the ammonia detection device and air-fuel ratio detection device, so explanations will be omitted.

Note that, in the sixth embodiment, in the same way as the first embodiment, the downstream side air-fuel ratio sensor 41 may be arranged in the exhaust passage of the internal combustion engine 100' at the downstream side of the upstream side catalyst 20 in the direction of flow of exhaust. In this case, instead of the pump cell 72 of the $NO_X$ sensor 48, the downstream side air-fuel ratio sensor 41 may function as the air-fuel ratio detection device.

Other Embodiments

Above, preferred embodiments of the present invention were explained, but the present invention is not limited to these embodiments. Various modifications and changes may be made within the language of the claims. For example, the upstream side air-fuel ratio sensor 40 may be an oxygen sensor arranged at the upstream side of the upstream side catalyst 20 in the direction of flow of exhaust and detecting whether the air-fuel ratio of the inflowing exhaust gas is rich or lean. Similarly, the downstream side air-fuel ratio sensor 41 (air-fuel ratio detection device) may be an oxygen sensor arranged at a downstream side of the upstream side catalyst 20 in the direction of flow of exhaust and detecting whether the air-fuel ratio of the outflowing exhaust gas is rich or lean.

Further, at step S104 of FIG. 10, the air-fuel ratio control part 51 may start the rich control when the estimated value of the oxygen storage amount of the upstream side catalyst 20 rises to a predetermined amount during the lean control. The predetermined amount is a value set in advance and smaller than the maximum storable oxygen amount of the upstream side catalyst 20. In this case, at the start of the rich control, it is possible to keep the $NO_X$ from flowing out from the upstream side catalyst 20. The estimated value of the oxygen storage amount of the upstream side catalyst 20 is calculated based on the air-fuel ratio detected by the upstream side air-fuel ratio sensor 40 or the target air-fuel ratio of the inflowing exhaust gas, fuel injection amount of the fuel injector 11, etc. Similar changes are possible at step S405 of FIG. 15, step S507 of FIG. 16, and step S604 of FIG. 21 as well. Further, at step S203 of FIG. 13 and step S303 of FIG. 14, the air-fuel ratio control part 51 may end the lean control when the estimated value of the oxygen storage amount of the upstream side catalyst 20 rises up to a predetermined amount during the lean control.

Further, if the air-fuel ratio detected by the downstream side air-fuel ratio sensor 41 is the stoichiometric air-fuel ratio or more, the oxygen storage amount of the upstream side catalyst 20 is estimated as larger than zero. For this reason, the air-fuel ratio control part 51 may start the rich control when the air-fuel ratio detected by the downstream side air-fuel ratio sensor 41 is the stoichiometric air-fuel ratio or more. In this case, at step S103, the air-fuel ratio control part 51 judges whether the air-fuel ratio detected by the downstream side air-fuel ratio sensor 41 is the stoichiometric air-fuel ratio or more instead of performing the lean control or during execution or after execution of the lean control. Further, if it is judged that the air-fuel ratio detected by the downstream side air-fuel ratio sensor 41 is the stoichiometric air-fuel ratio or more, the control routine proceeds to step S104, while if it is judged that the air-fuel ratio detected by the downstream side air-fuel ratio sensor 41 is richer than the stoichiometric air-fuel ratio, the control routine is ended. Similar changes are possible at step S203 of FIG. 13, step S303 of FIG. 14, step S404 of FIG. 15, step S506 of FIG. 16, and step S603 of FIG. 21 as well.

Further, if fuel cut control where the supply of fuel to the combustion chambers 5 of the internal combustion engine 100 is stopped is performed, a large amount of oxygen flows into the upstream side catalyst 20 and the oxygen storage amount of the upstream side catalyst 20 reaches the maximum storable oxygen amount. For this reason, the air-fuel ratio control part 51 may start the rich control when the fuel cut control is ended. In this case, at step S103, the air-fuel ratio control part 51 judges whether the fuel cut control has ended instead of performing the lean control. If it is judged that the fuel cut control has ended, the control routine proceeds to step S104. If the fuel cut control is not being performed or if the fuel cut control is underway, the control routine is ended. Similar changes are possible at step S203 of FIG. 13, step S303 of FIG. 14, step S404 of FIG. 15, step S506 of FIG. 16, and step S603 of FIG. 21 as well.

Further, step S108 to step S110 of FIG. 10, step S209 to step S211 of FIG. 13, step S309 to step S311 of FIG. 14, step S409 to step S411 of FIG. 15, step S511 to step S513 of FIG. 16, and step S608 to step S610 of FIG. 21 may be omitted.

Further, if the rich control and lean control are alternately performed in normal control where abnormality of the ammonia detection device is not diagnosed, abnormality of the ammonia detection device may be diagnosed at a timing in normal control where the rich control is performed.

Further, the above-mentioned embodiments can be carried out in any combinations. For example, the sixth embodiment may be combined with the second embodiment to fifth embodiment. In this case, the sensor cell 71 and pump cell 72 of the $NO_X$ sensor 48 are used as the ammonia detection device and air-fuel ratio detection device, and instead of step S206 of FIG. 13, step S306 of FIG. 14, step S406 of FIG. 15, and step S508 of FIG. 16, step S605 of FIG. 21 is performed.

REFERENCE SIGNS LIST 1, 1', 1". abnormality diagnosis system
20. upstream side catalyst
22. exhaust pipe
31. electronic control unit (ECU)
41. downstream side air-fuel ratio sensor
46. ammonia sensor
48. $NO_X$ sensor
51. air-fuel ratio control part
52. abnormality judgment part
71. sensor cell
72. pump cell
100, 100'. internal combustion engine

The invention claimed is:
1. An abnormality diagnosis system of an ammonia detection device arranged in an exhaust passage of an internal combustion engine at a downstream side of a catalyst in a direction of flow of exhaust, comprising:
an air-fuel ratio detection device arranged in the exhaust passage at the downstream side of the catalyst in the direction of flow of exhaust; and
an electronic control unit configured to:
control an air-fuel ratio of inflowing exhaust gas flowing into the catalyst, judge abnormality of the ammonia detection device,
perform rich control making the air-fuel ratio of the inflowing exhaust gas richer than a stoichiometric air-fuel ratio so that an oxygen storage amount of the catalyst decreases, and
judge that the ammonia detection device is abnormal if, after start of the rich control, an output value of the ammonia detection device does not rise to a reference value before the air-fuel ratio detected by the air-fuel ratio detection device falls to a rich judged air-fuel ratio richer than a stoichiometric air-fuel ratio, wherein the catalyst is a three-way catalyst, and the electronic control unit is configured to judge abnormality of the air-fuel ratio detection device, judge abnormality of the ammonia detection device if judging that the air-fuel ratio detection device is normal, and not judge abnormality of the ammonia detection device if judging that the air-fuel ratio detection device is abnormal.

2. The abnormality diagnosis system of an ammonia detection device according to claim 1, wherein the electronic control unit is configured to judge that an output of the ammonia detection device is falling if, after the start of the rich control, the output value of the ammonia detection device does not rise to the reference value until a predetermined time elapses from when the air-fuel ratio detected by the air-fuel ratio detection device falls to the rich judged air-fuel ratio.

3. The abnormality diagnosis system of an ammonia detection device according to claim 1, wherein the electronic control unit is configured to judge that a response of the ammonia detection device is falling if, after the start of the rich control, the output value of the ammonia detection device rises to the reference value within a predetermined time from when the air-fuel ratio detected by the air-fuel ratio detection device falls to the rich judged air-fuel ratio.

4. The abnormality diagnosis system of an ammonia detection device according to claim 1, further comprising a temperature detection part configured to detect or estimate a temperature of the catalyst or a temperature of exhaust gas flowing out from the catalyst, wherein the electronic control unit is configured to perform the rich control when a temperature detected or estimated by the temperature detection part is less than a predetermined temperature.

5. The abnormality diagnosis system of an ammonia detection device according to claim 1, wherein the electronic control unit is configured to perform the rich control when the internal combustion engine is in an idling state.

6. The abnormality diagnosis system of an ammonia detection device according to claim 1, wherein the electronic control unit is configured to correct at least one of output characteristics of the air-fuel ratio detection device and the rich judged air-fuel ratio if it is judged by the electronic control unit that the air-fuel ratio detection device is abnormal.

7. The abnormality diagnosis system of an ammonia detection device according to claim 1, wherein the electronic control unit is configured to perform lean control making the air-fuel ratio of the inflowing exhaust gas leaner than a stoichiometric air-fuel ratio so that the oxygen storage amount of the catalyst increases, before the rich control.

8. The abnormality diagnosis system of an ammonia detection device according to claim 7, wherein the electronic control unit is configured to start the rich control when the air-fuel ratio detected by the air-fuel ratio detection device rises to a lean judged air-fuel ratio leaner than a stoichiometric air-fuel ratio.

9. The abnormality diagnosis system of an ammonia detection device according to claim 1, wherein the electronic control unit is configured to start the rich control when fuel cut control where supply of fuel to a combustion chamber of the internal combustion engine is stopped has ended.

10. The abnormality diagnosis system of an ammonia detection device according to claim 1, wherein the ammonia detection device is a sensor cell of an NOX sensor.

11. The abnormality diagnosis system of an ammonia detection device according to claim 10, wherein the electronic control unit is configured to perform lean control making the air-fuel ratio of the inflowing exhaust gas leaner than a stoichiometric air-fuel ratio so that the oxygen storage amount of the catalyst increases, and start the rich control when the air-fuel ratio detected by the air-fuel ratio detection device rises to a lean judged air-fuel ratio leaner than the stoichiometric air-fuel ratio due to the lean control, and judge that the ammonia detection device is abnormal if, after the start of the rich control, the output value of the ammonia detection device does not rise to the reference value in a predetermined period before the air-fuel ratio detected by the air-fuel ratio detection device falls to the rich judged air-fuel ratio.

12. The abnormality diagnosis system of an ammonia detection device according to claim 10, wherein the air-fuel ratio detection device is a pump cell of the NOX sensor.

13. The abnormality diagnosis system of an ammonia detection device according to claim 1, wherein the catalyst is configured so that when an exhaust gas of an air-fuel ratio richer than a stoichiometric air-fuel ratio continues to flow into the catalyst, ammonia flows out from the catalyst earlier than HC and CO.

14. The abnormality diagnosis system of an ammonia detection device according to claim 1, wherein the electronic control unit is configured to make the air-fuel ratio of the inflowing exhaust gas leaner than the stoichiometric air-fuel ratio when the air-fuel ratio detected by the air-fuel ratio detection device falls to the rich judged air-fuel ratio in the rich control.

15. The abnormality diagnosis system of an ammonia detection device according to claim 1, wherein the air-fuel ratio detection device and the ammonia detection device are arranged between the three-way catalyst and a downstream side catalyst arranged at a downstream side of the three-way catalyst in the direction of flow of exhaust.

16. An abnormality diagnosis system of an ammonia detection device arranged in an exhaust passage of an internal combustion engine at a downstream side of a catalyst in a direction of flow of exhaust, comprising:

an air-fuel ratio detection device arranged in the exhaust passage at the downstream side of the catalyst in the direction of flow of exhaust; and an electronic control unit configured to:

control an air-fuel ratio of inflowing exhaust gas flowing into the catalyst, judge abnormality of the ammonia detection device, perform rich control making the air-fuel ratio of the inflowing exhaust gas richer than a stoichiometric air-fuel ratio so that an oxygen storage amount of the catalyst decreases, and judge that the ammonia detection device is abnormal if, after start of the rich control, an output value of the ammonia detection device does not rise to a reference value before the air-fuel ratio detected by the air-fuel ratio detection device falls to a rich judged air-fuel ratio richer than a stoichiometric air-fuel ratio, wherein the catalyst is a three-way catalyst, and the electronic control unit is configured to judge abnormality of the air-fuel ratio detection device, and correct at least one of output characteristics of the air-fuel ratio detection device and the rich judged air-fuel ratio if it is judged by the electronic control unit that the air-fuel ratio detection device is abnormal.

\* \* \* \* \*